(12) United States Patent
Nakahara et al.

(10) Patent No.: US 6,906,825 B1
(45) Date of Patent: Jun. 14, 2005

(54) IMAGE PROCESSOR AND COLOR IMAGE PROCESSOR

(75) Inventors: Nobuhiko Nakahara, Susono (JP); Hiroki Umezawa, Shizuoka-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 865 days.

(21) Appl. No.: 09/595,052

(22) Filed: Jun. 14, 2000

(30) Foreign Application Priority Data

Jun. 14, 1999 (JP) .......................................... 11-166878
Apr. 25, 2000 (JP) ....................................... 2000-123970

(51) Int. Cl.⁷ ........................ G06F 15/00; G06K 15/00; G06K 9/00
(52) U.S. Cl. ........................ 358/1.9; 358/3.13; 382/167
(58) Field of Search ............................. 358/3.13, 3.22, 358/534, 535, 536, 1.9, 3.09, 1.2, 53.4; 382/167, 162, 251; 347/15, 40

(56) References Cited

U.S. PATENT DOCUMENTS

| | | | | |
|---|---|---|---|---|
| 4,663,662 A | * | 5/1987 | Sekizawa et al. | ........... 358/530 |
| 4,758,886 A | * | 7/1988 | Rylander | ................... 358/534 |
| 4,920,501 A | | 4/1990 | Sullivan et al. | |
| 5,111,310 A | | 5/1992 | Parker et al. | |
| 5,535,020 A | | 7/1996 | Ulichney | |
| 5,627,919 A | * | 5/1997 | Kemmochi | ................. 382/254 |
| 5,710,828 A | * | 1/1998 | Hashimoto | ................. 382/172 |
| 5,712,929 A | * | 1/1998 | Kawamura et al. | ........ 382/270 |
| 5,815,286 A | * | 9/1998 | Matsuba et al. | ........... 358/3.19 |
| 5,875,287 A | * | 2/1999 | Li et al. | ...................... 358/1.2 |
| 5,909,512 A | * | 6/1999 | Ohshima et al. | ............ 382/251 |
| 6,021,217 A | * | 2/2000 | Nakahara | .................... 382/169 |
| 6,031,627 A | * | 2/2000 | Kakutani | .................... 358/1.9 |
| 6,166,751 A | * | 12/2000 | Yamada | ...................... 347/131 |
| 6,185,005 B1 | * | 2/2001 | Yoo | ............................. 358/1.9 |
| 6,250,733 B1 | * | 6/2001 | Yao et al. | ..................... 347/15 |
| 6,278,802 B1 | * | 8/2001 | Delabastita et al. | ........ 382/251 |
| 6,288,795 B1 | * | 9/2001 | Urasawa | .................... 358/3.09 |
| 6,312,096 B1 | * | 11/2001 | Koitabashi et al. | .......... 347/40 |
| 6,356,363 B1 | * | 3/2002 | Cooper et al. | ............... 358/1.9 |
| 6,606,168 B1 | * | 8/2003 | Rylander | ................... 358/3.09 |
| 6,714,320 B1 | * | 3/2004 | Nakahara et al. | .......... 358/3.13 |
| 6,760,126 B1 | * | 7/2004 | Kritayakirana et al. | ...... 358/2.1 |
| 2003/0133161 A1 | * | 7/2003 | Harrington | |

OTHER PUBLICATIONS

Robert Ulichney; "The Void–and–Cluster Method For Dither Array Generation"; pp. 332–339; SPIE vol. 1913.

* cited by examiner

*Primary Examiner*—Madeleine Nguyen
(74) *Attorney, Agent, or Firm*—Frishauf, Holtz, Goodman & Chick, P.C.

(57) ABSTRACT

A halftone processing section halftone-processes input image data using a plurality of dither threshold planes. An image output section having different output position accuracies between a main scan direction and a sub-scan direction outputs an image corresponding to halftone-processed image data. Each of the dither threshold planes consists of a plurality of the same unit threshold matrixes. In the unit threshold matrix, a relatively medium to high threshold array in a predetermined threshold range corresponding to the entire tone range of the input image data is an aperiodic array and an anisotropic array with neighboring thresholds having close values, in a direction coincident with a scan direction, in which the output position accuracy of the image output means is low. With this configuration, the image output section outputs an image having serial medium and high tone dots in the scan direction.

21 Claims, 35 Drawing Sheets

| 7 | 8 | 5 | 6 |
|---|---|---|---|
| 4 | 1 | 2 | 3 |
| 5 | 6 | 7 | 8 |
| 2 | 3 | 4 | 1 |

FIG. 7A

REFERENCE THRESHOLD

| | 1 | 2 | 3 | 4 | 5 | 6 | 7 | 8 |
|---|---|---|---|---|---|---|---|---|
| 1 | 1 | 2 | 3 | 4 | 5 | 6 | 7 → | 8 |
| 2 | 9 | 10 | 11 | 12 | 13 | 14 | 15 | 16 |
| 3 | 17 | 18 | 19 | 20 | 21 | 22 | 23 | 24 |
| 4 | 25 | 26 | 27 | 28 | 29 | 30 | 31 | 32 |
| 5 | 33 | 34 | 35 | 36 | 37 | 38 | 39 | 40 |
| 6 | 41 | 42 | 43 | 44 | 45 | 46 | 47 | 48 |
| 7 | 49 | 50 | 51 | 52 | 53 | 54 | 55 | 56 |

THRESHOLD PLANE

FIG. 7B

REFERENCE THRESHOLD

| | 1 | 2 | 3 | 4 | 5 | 6 | 7 | 8 |
|---|---|---|---|---|---|---|---|---|
| 1 | 1 | 8 | 15 | 22 | 29 | 36 | 43 | 50 |
| 2 | 2 | 9 | 16 | 23 | 30 | 37 | 44 | 51 |
| 3 | 3 | 10 | 17 | 24 | 31 | 38 | 45 | 52 |
| 4 | 4 | 11 | 18 | 25 | 32 | 39 | 46 | 53 |
| 5 | 5 | 12 | 19 | 26 | 33 | 40 | 47 | 54 |
| 6 | 6 | 13 | 20 | 27 | 34 | 41 | 48 | 55 |
| 7 | 7 | 14 | 21 | 28 | 35 | 42 | 49 | 56 |

THRESHOLD PLANE

FIG. 7C

REFERENCE THRESHOLD

| | 1 | 2 | 3 | 4 | 5 | 6 | 7 | 8 |
|---|---|---|---|---|---|---|---|---|
| 1 | 1 | 2 | 5 | 6 | 11 | 12 | 19 | 20 |
| 2 | 3 | 4 | 9 | 10 | 17 | 18 | 27 | 28 |
| 3 | 7 | 8 | 15 | 16 | 25 | 26 | 35 | 36 |
| 4 | 13 | 14 | 23 | 24 | 33 | 34 | 43 | 44 |
| 5 | 21 | 22 | 31 | 32 | 41 | 42 | 49 | 50 |
| 6 | 29 | 30 | 39 | 40 | 47 | 48 | 53 | 54 |
| 7 | 37 | 38 | 45 | 46 | 51 | 52 | 55 | 56 |

THRESHOLD PLANE

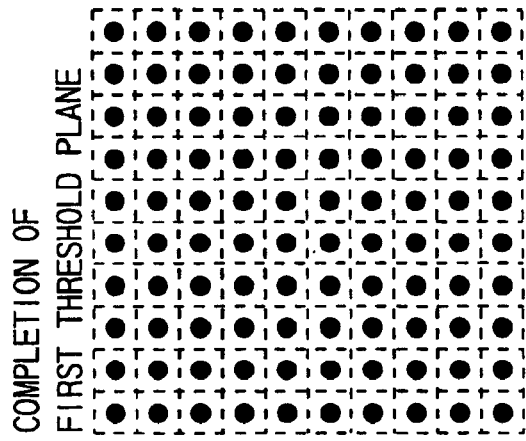
FIG. 9A
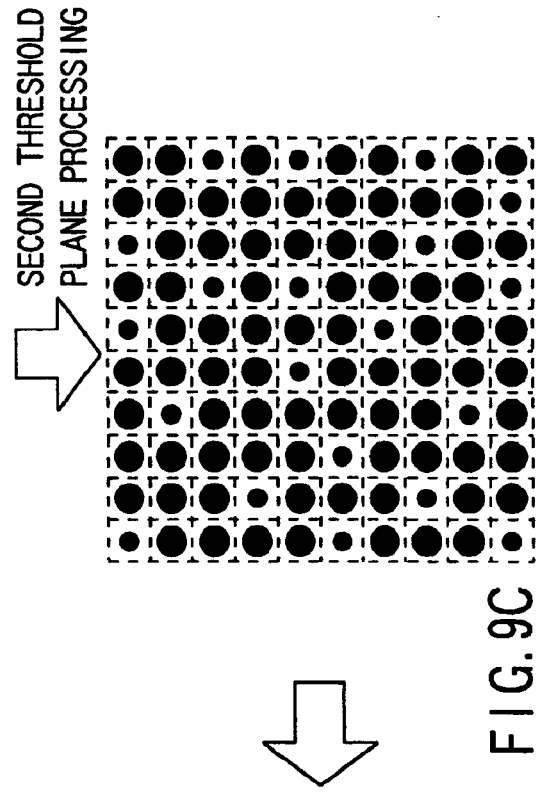
FIG. 9B
FIG. 9C
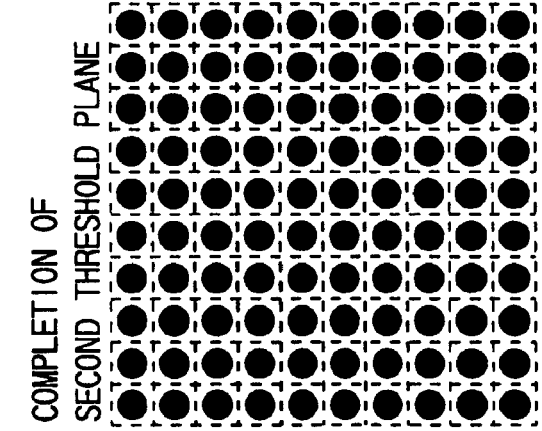
FIG. 9D

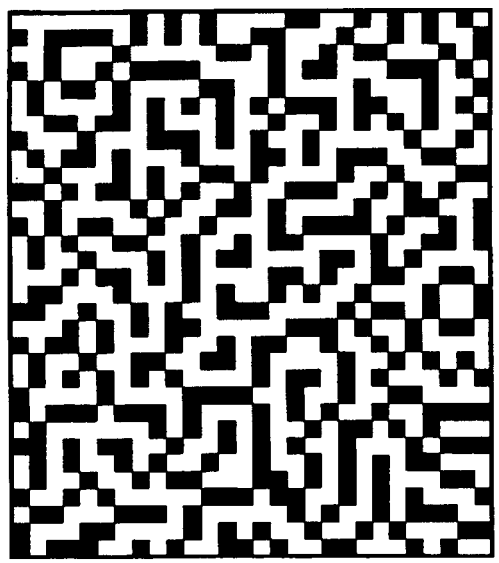
FIG. 13A  $k_i = k_j$
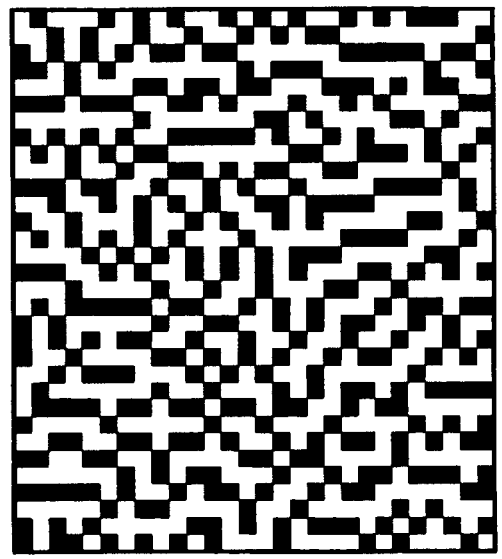
FIG. 13B  $k_i < k_j$
COUPLING STRENGTH
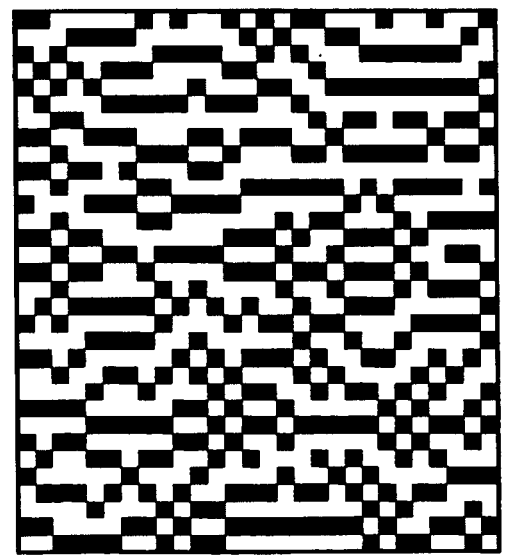
FIG. 13C  $k_i \ll k_j$
SMALL ↑   ↓ LARGE

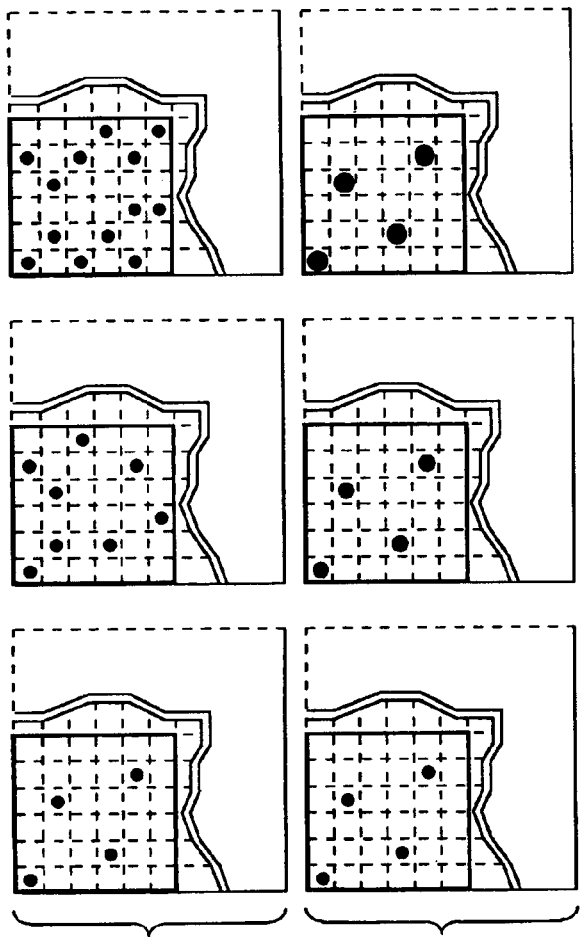

REFERENCE THRESHOLD

| THRESHOLD PLANE | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 |
|---|---|---|---|---|---|---|---|---|---|---|---|---|---|---|---|---|---|---|---|---|---|---|---|---|---|---|---|---|---|---|---|---|---|---|---|---|
| 1 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 |
| 2 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 97 | 98 | 99 | 100 | 101 | 102 | 103 | 104 | 105 | 106 | 107 | 108 |
| 3 | 61 | 62 | 63 | 64 | 65 | 66 | 67 | 68 | 69 | 70 | 71 | 72 | 85 | 86 | 87 | 88 | 89 | 90 | 91 | 92 | 93 | 94 | 95 | 96 | 133 | 134 | 135 | 136 | 137 | 138 | 139 | 140 | 141 | 142 | 143 | 144 |
| 4 | 73 | 74 | 75 | 76 | 77 | 78 | 79 | 80 | 81 | 82 | 83 | 84 | 121 | 122 | 123 | 124 | 125 | 126 | 127 | 128 | 129 | 130 | 131 | 132 | 169 | 170 | 171 | 172 | 173 | 174 | 175 | 176 | 177 | 178 | 179 | 180 |
| 5 | 109 | 110 | 111 | 112 | 113 | 114 | 115 | 116 | 117 | 118 | 119 | 120 | 157 | 158 | 159 | 160 | 161 | 162 | 163 | 164 | 165 | 166 | 167 | 168 | 205 | 206 | 207 | 208 | 209 | 210 | 211 | 212 | 213 | 214 | 215 | 216 |
| 6 | 145 | 146 | 147 | 148 | 149 | 150 | 151 | 152 | 153 | 154 | 155 | 156 | 193 | 194 | 195 | 196 | 197 | 198 | 199 | 200 | 201 | 202 | 203 | 204 | 229 | 230 | 231 | 232 | 233 | 234 | 235 | 236 | 237 | 238 | 239 | 240 |
| 7 | 181 | 182 | 183 | 184 | 185 | 186 | 187 | 188 | 189 | 190 | 191 | 192 | 217 | 218 | 219 | 220 | 221 | 222 | 223 | 224 | 225 | 226 | 227 | 228 | 241 | 242 | 243 | 244 | 245 | 246 | 247 | 248 | 249 | 250 | 251 | 252 |

FIG. 21B

REFERENCE THRESHOLD

| THRESHOLD PLANE | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 |
|---|---|---|---|---|---|---|---|---|---|---|---|---|---|---|---|---|---|---|---|---|---|---|---|---|---|---|---|---|---|---|---|---|---|---|---|---|
| 1 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 |
| 2 | 37 | 38 | 39 | 40 | 41 | 42 | 43 | 44 | 45 | 46 | 47 | 48 | 49 | 50 | 51 | 52 | 53 | 54 | 73 | 74 | 75 | 76 | 77 | 78 | 79 | 80 | 81 | 82 | 83 | 84 | 85 | 86 | 87 | 88 | 89 | 90 |
| 3 | 55 | 56 | 57 | 58 | 59 | 60 | 61 | 62 | 63 | 64 | 65 | 66 | 67 | 68 | 69 | 70 | 71 | 72 | 109 | 110 | 111 | 112 | 113 | 114 | 115 | 116 | 117 | 118 | 119 | 120 | 121 | 122 | 123 | 124 | 125 | 126 |
| 4 | 91 | 92 | 93 | 94 | 95 | 96 | 97 | 98 | 99 | 100 | 101 | 102 | 103 | 104 | 105 | 106 | 107 | 108 | 145 | 146 | 147 | 148 | 149 | 150 | 151 | 152 | 153 | 154 | 155 | 156 | 157 | 158 | 159 | 160 | 161 | 162 |
| 5 | 127 | 128 | 129 | 130 | 131 | 132 | 133 | 134 | 135 | 136 | 137 | 138 | 139 | 140 | 141 | 142 | 143 | 144 | 181 | 182 | 183 | 184 | 185 | 186 | 187 | 188 | 189 | 190 | 191 | 192 | 193 | 194 | 195 | 196 | 197 | 198 |
| 6 | 163 | 164 | 165 | 166 | 167 | 168 | 169 | 170 | 171 | 172 | 173 | 174 | 175 | 176 | 177 | 178 | 179 | 180 | 217 | 218 | 219 | 220 | 221 | 222 | 223 | 224 | 225 | 226 | 227 | 228 | 229 | 230 | 231 | 232 | 233 | 234 |
| 7 | 199 | 200 | 201 | 202 | 203 | 204 | 205 | 206 | 207 | 208 | 209 | 210 | 211 | 212 | 213 | 214 | 215 | 216 | 235 | 236 | 237 | 238 | 239 | 240 | 241 | 242 | 243 | 244 | 245 | 246 | 247 | 248 | 249 | 250 | 251 | 252 |

ANISOTROPIC

NON-ANISOTROPIC

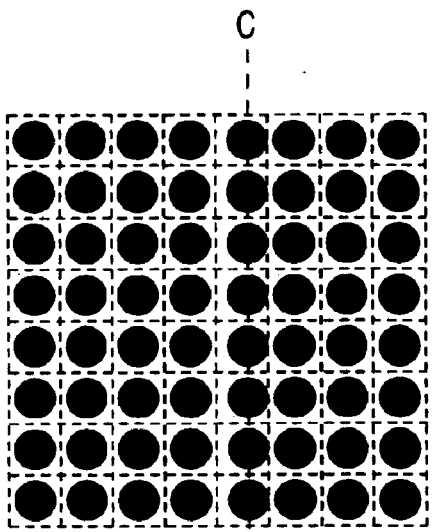
F I G. 23A
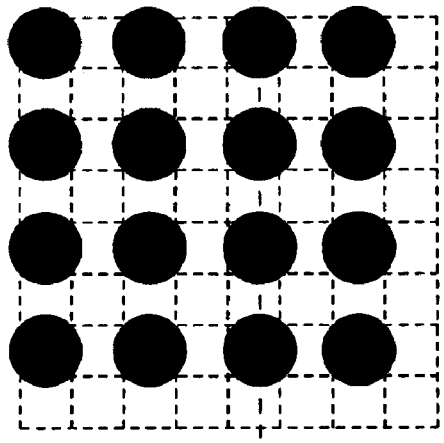
F I G. 23B
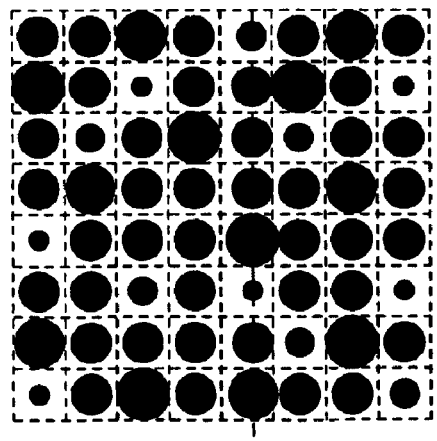
F I G. 23C
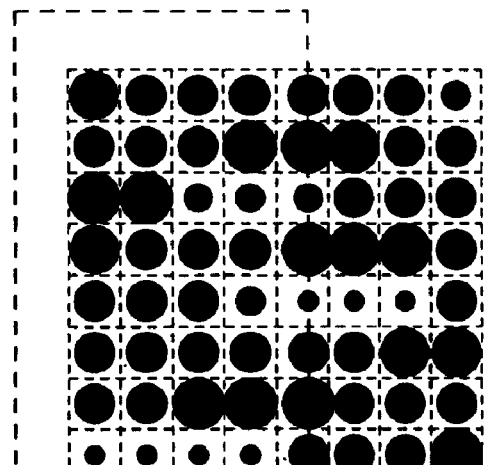
F I G. 23D

| INPUT VALUE | 0 | 1 | 2 | 3 | 4 | 5 | 6 | 7 |
|---|---|---|---|---|---|---|---|---|
| BEFORE γ CORRECTION | 0 | 4 | 4 | 4 | 4 | 4 | 4 | 4 |
| AFTER γ CORRECTION (ACTUAL NUMBER) | 0 | 0.6 | 1 | 1.5 | 2 | 2.8 | 3.8 | 5 |
| ON NUMBER (INTEGER) | 0 | 2 | 2 | 2 | 2 | 3 | 4 | 4 |

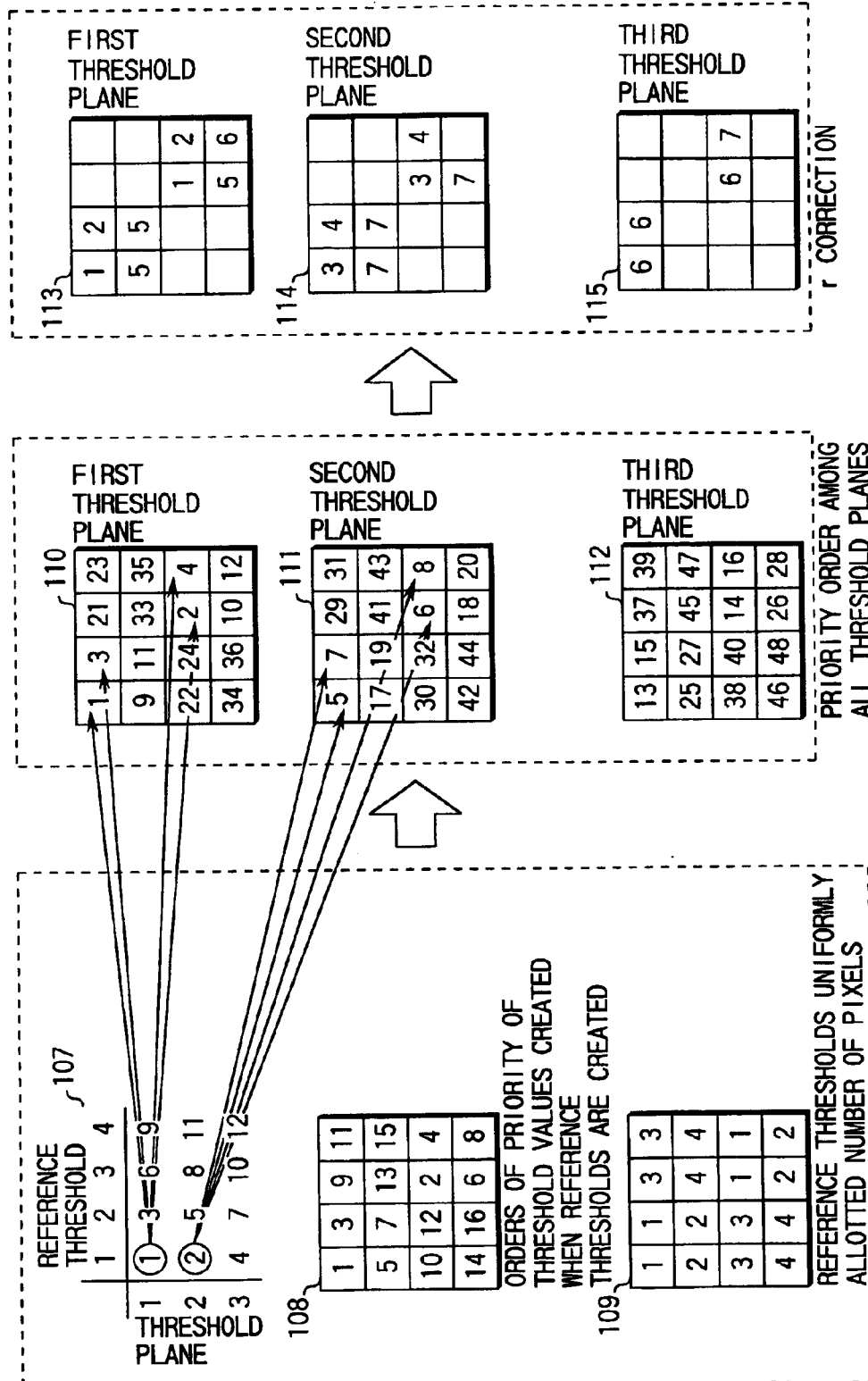

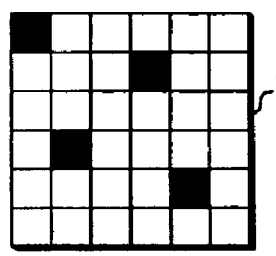 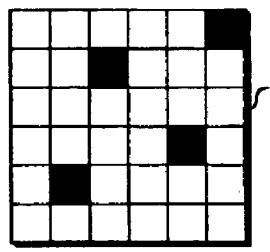 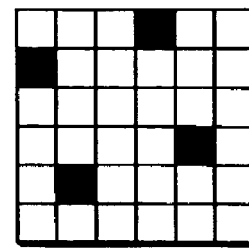
INVERTED
HORIZONTALLY
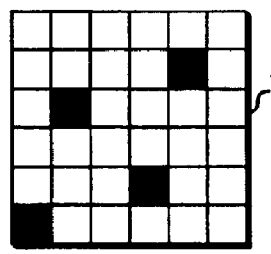
INVERTED
VERTICALLY
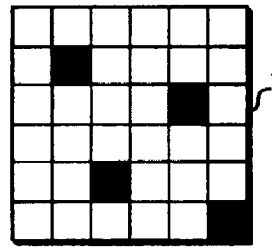
ROTATED
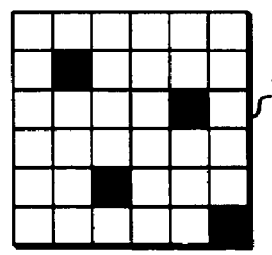
SHIFTED
FIG. 28

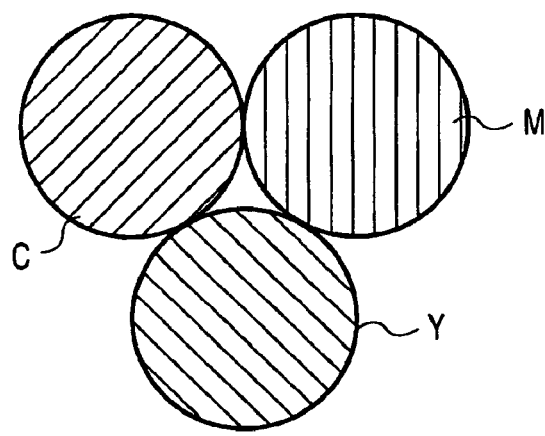
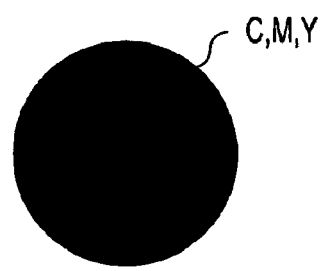
FIG. 29A  FIG. 29B
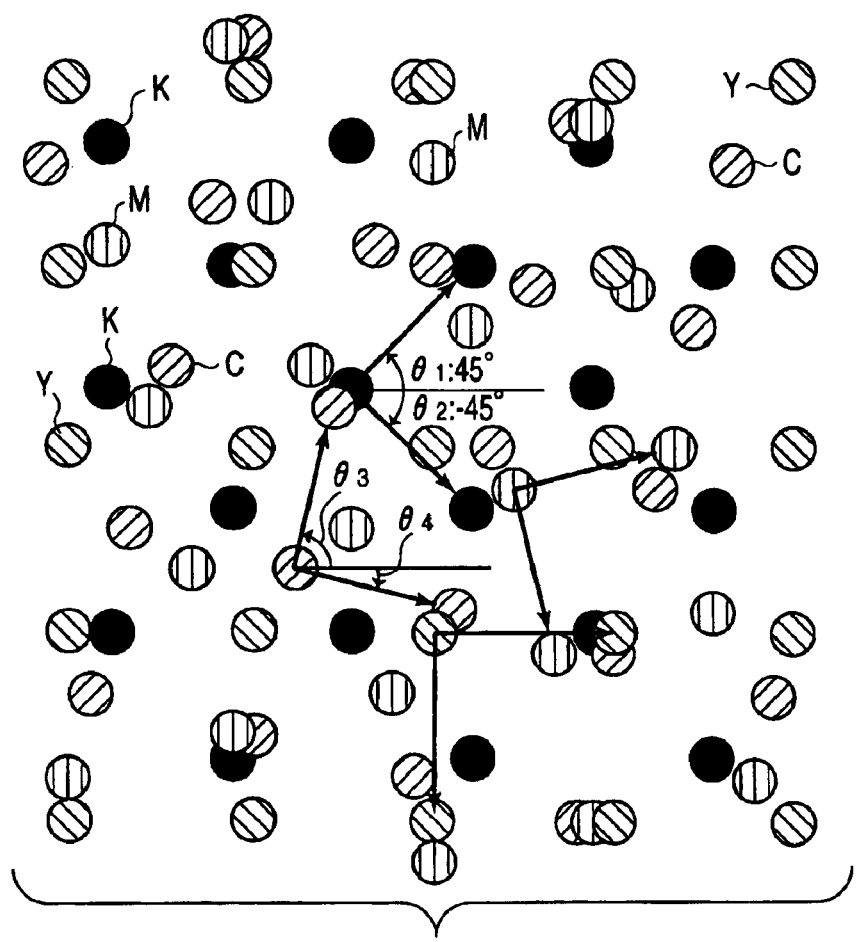
FIG. 30

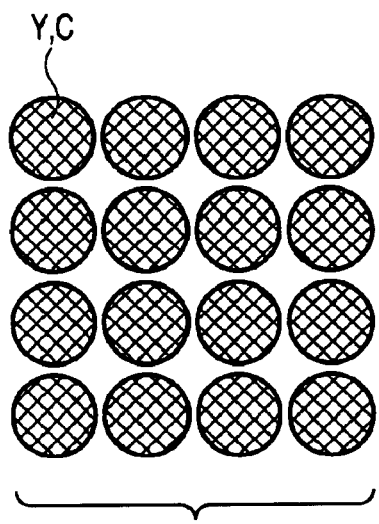 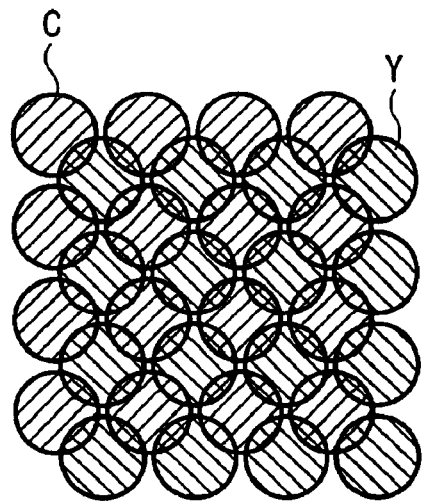
F I G. 31A        F I G. 31B
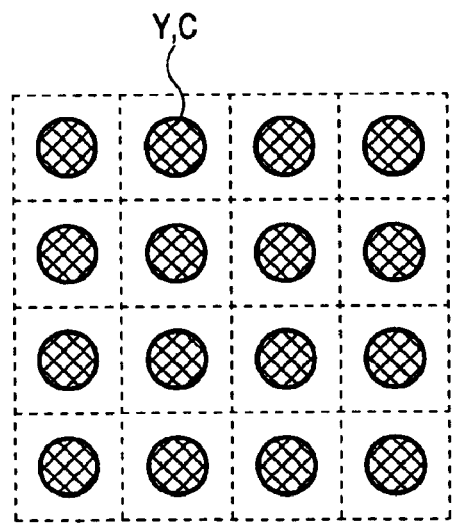 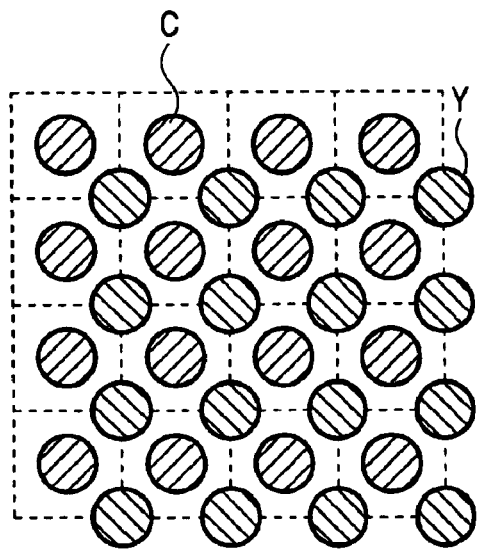
F I G. 32A        F I G. 32B

FIG. 37A

| THRESHOLD PLANE \ REFERENCE THRESHOLD | 1 | 2 | 3 | 4 | 5 | 6 | 7 | 8 |
|---|---|---|---|---|---|---|---|---|
| 1 | 1 | 2 | 3 | 4 | 5 | 6 | 9 | 10 |
| 2 | 7 | 8 | 11 | 12 | 13 | 14 | 17 | 18 |
| 3 | 15 | 16 | 19 | 20 | 21 | 22 | 25 | 26 |
| 4 | 23 | 24 | 27 | 28 | 29 | 30 | 33 | 34 |
| 5 | 31 | 32 | 35 | 36 | 37 | 38 | 41 | 42 |
| 6 | 39 | 40 | 43 | 44 | 45 | 46 | 49 | 50 |
| 7 | 47 | 48 | 51 | 52 | 53 | 54 | 55 | 56 |

FIG. 37B

| THRESHOLD PLANE \ REFERENCE THRESHOLD | 1 | 2 | 3 | 4 | 5 | 6 | 7 | 8 |
|---|---|---|---|---|---|---|---|---|
| 1 | 1 | 2 | 3 | 4 | 5 | 9 | 10 | 11 |
| 2 | 6 | 7 | 8 | 12 | 13 | 17 | 18 | 19 |
| 3 | 14 | 15 | 16 | 20 | 21 | 25 | 26 | 27 |
| 4 | 22 | 23 | 24 | 28 | 29 | 33 | 34 | 35 |
| 5 | 30 | 31 | 32 | 36 | 37 | 41 | 42 | 43 |
| 6 | 38 | 39 | 40 | 44 | 45 | 49 | 50 | 51 |
| 7 | 46 | 47 | 48 | 52 | 53 | 54 | 55 | 56 |

FIG. 37C

| THRESHOLD PLANE \ REFERENCE THRESHOLD | 1 | 2 | 3 | 4 | 5 | 6 | 7 | 8 |
|---|---|---|---|---|---|---|---|---|
| 1 | 1 | 2 | 3 | 4 | 5 | 6 | 7 | 9 |
| 2 | 8 | 10 | 11 | 12 | 13 | 14 | 15 | 17 |
| 3 | 16 | 18 | 19 | 20 | 21 | 22 | 23 | 25 |
| 4 | 24 | 26 | 27 | 28 | 29 | 30 | 31 | 33 |
| 5 | 32 | 34 | 35 | 36 | 37 | 38 | 39 | 44 |
| 6 | 40 | 42 | 43 | 44 | 45 | 46 | 47 | 49 |
| 7 | 48 | 50 | 51 | 52 | 53 | 54 | 55 | 56 |

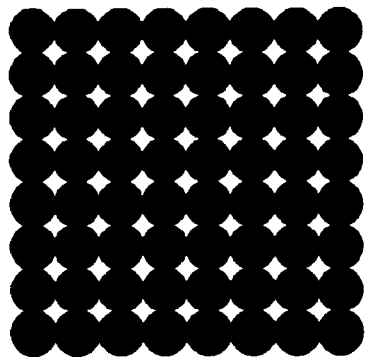
FIG. 38A
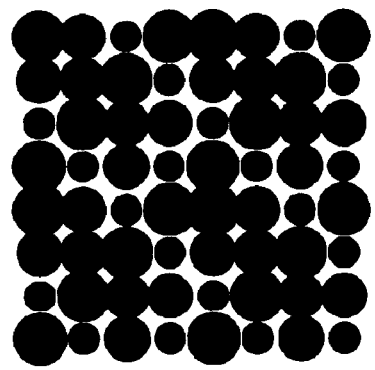
FIG. 38B
| THRESHOLD PLANE | REFERENCE THRESHOLD | | | | | | | |
|---|---|---|---|---|---|---|---|---|
| | 1 | 2 | 3 | 4 | 5 | 6 | 7 | 8 |
| 1 | 1 | 2 | 3 | 4 | 5 | 6 | 15 | 16 |
| 2 | 7 | 8 | 11 | 12 | 13 | 14 | 23 | 24 |
| 3 | 9 | 10 | 19 | 20 | 21 | 22 | 31 | 32 |
| 4 | 17 | 18 | 27 | 28 | 29 | 30 | 39 | 40 |
| 5 | 25 | 26 | 35 | 36 | 37 | 38 | 47 | 48 |
| 6 | 33 | 34 | 43 | 44 | 45 | 46 | 53 | 54 |
| 7 | 41 | 42 | 49 | 50 | 51 | 52 | 55 | 56 |
FIG. 39A
| THRESHOLD PLANE | REFERENCE THRESHOLD | | | | | | | |
|---|---|---|---|---|---|---|---|---|
| | 1 | 2 | 3 | 4 | 5 | 6 | 7 | 8 |
| 1 | 1 | 2 | 3 | 4 | 5 | 9 | 10 | 12 |
| 2 | 11 | 13 | 14 | 15 | 16 | 17 | 18 | 20 |
| 3 | 19 | 21 | 22 | 23 | 24 | 25 | 28 | 29 |
| 4 | 26 | 27 | 30 | 31 | 32 | 33 | 36 | 37 |
| 5 | 34 | 35 | 38 | 39 | 40 | 44 | 45 | 46 |
| 6 | 41 | 42 | 43 | 47 | 48 | 52 | 53 | 54 |
| 7 | 49 | 50 | 51 | 55 | 56 | 57 | 58 | 59 |
FIG. 39B

IMAGE PROCESSOR AND COLOR IMAGE PROCESSOR

CROSS-REFERENCE TO RELATED APPLICATIONS

This application is based upon and claims the benefit of priority from the prior Japanese Patent Applications No. 11-166878, filed Jun. 14, 1999; and No. 2000-123970, filed Apr. 25, 2000, the entire contents of which are incorporated herein by reference.

BACKGROUND OF THE INVENTION

The present invention relates to an image processor and a color image processor for dithering multi-tone-level input image data to convert the data into data of fewer tone levels, used in a printer, a copier, a facsimile machine, an MFP (Multi-Function Peripheral) and the like.

Conventionally, a binary image output printer employing a line head, such as a line LED (light emission diode) head, a line thermal head and a line ink jet head, forms a binary image by printing dots coincident with the resolution of the head. Namely, if a line LED head is employed, dots having a size coincident with the distance between a plurality of recording elements (LED) linearly arranged in main scan direction are printed on a recording paper sheet to thereby print a binary image. If a thermal head is employed, dots having a size coincident with the distance between a plurality of recording elements (heating resistor) linearly arranged in main scan direction are printed on a recording paper sheet to thereby print a binary image. It is also well known to shift the head slightly in the direction of the main scanning to form an image on the same paper sheet repeatedly and to thereby realize a higher resolution than that corresponding to the distance between the recording elements.

In the image forming apparatus provided with the recording head of this type, a character/line image is reproduced as a binary image simply corresponding to the resolution of the head. A graphic/photograph image is reproduced as a binary image by a halftone processing such as an ordered dither method or an error diffusion method. In the halftone processing, it is difficult to both maintain a high resolution and reproduce a high tone level. In case of the ordered dither processing using the same threshold matrix repeatedly, In particular, resolution and tone properties are contradicting properties. The halftone processing is also used for color characters, shading colors and the like.

Further, as the image forming apparatuses provided with a recording head as stated above, there is proposed one for modulating the printing area of one pixel (or adjusting dot size) based on multi-level image data converted by the multi-level dither processing, thereby allowing expressing one pixel with several tone levels. An example of a recording head constituted by a plurality of recording elements used for such an apparatus as well as the state of dots is shown in FIG. 40. In FIG. 40, reference symbol 1 denotes a recording head, 2 denotes an ink discharge port and 3 denotes an output dot (printed dot).

For brevity, FIG. 40 illustrates an example of the output of dots of the image forming apparatus capable for expressing one pixel with three levels including white (output 0). In addition, by arranging four or three lines of these recording elements in parallel, it is possible to record a color image of C (cyan), M (magenta), Y (yellow) and K (black) or a CMY-color image.

The image forming apparatus capable of printing such multi-level image data conducts various image processings including a color conversion processing, a UCR (under-color elimination) processing and a gamma correction processing, to input RGB image data. Thereafter, the apparatus conducts a multi-level halftone processing such as a multi-level dither processing or a multi-level error diffusion processing employing screen angles for the respective colors so as to reproduce the number of tones intrinsic to a printer engine, to thereby obtain multi-level image data. The apparatus then outputs pixels having tone properties so as to enhance image reproducibility.

Generally, the ordered dither processing is relatively simple, has a high degree of freedom for configuration and has high processing speed, and the cost of the apparatus can be held down. However, it is said that the error diffusion processing is superior in image quality to the ordered dither processing. The ordered dither processing truncates quantization error in a comparison processing between input tone levels and thresholds, whereas the error diffusion processing diffuses quantization errors to peripheral pixels. Thus, they greatly differ in algorithm. As a result of the difference, compared with the ordered dither processing, the error diffusion processing can advantageously provide an output pattern having high frequency characteristics least conspicuous in light of human visibility, has a high edge holding effect and excellent image quality.

Oh the other hand, in a case of the halftone processing of a multi-level image output printer, it is known that the ordered dither processing and the error diffusion processing do not differ in image quality compared with the output of a binary image. This is because the truncated quantization error becomes far smaller than that of binary image data as the number of levels of the multi-level dither processing increases. In case of a high resolution printer, in particular, if the number of tones which one pixel can express is higher, the difference in image quality between the ordered dither processing and the error diffusion processing becomes less.

In addition, a method, such as a dither processing method employing fixed mask dither improved from stochastic dither or cluster dither, of realizing output characteristics comparable to that of the error diffusion processing at the same high speed as that of the ordered dither processing, is recently developed.

An ordinary binary output dither processing obtains binary output pixels by comparing input pixels with dither matrix thresholds at corresponding positions while basically, only taking into consideration a threshold array in a dither matrix on one plane. This state is shown in FIG. 41. FIG. 41 is a typical view showing a binary dither processing employing a well-known 4×4 Bayer dither matrix. To simplify description, input pixels of 4-bit tone level are compared with corresponding thresholds in a dither matrix. If the input tone level is equal to or higher than the corresponding threshold in the dither matrix, 1 (black) is output and if it is lower than the corresponding threshold, 0 (white) is output, thus obtaining a binary output image in combination of 1 and 0.

As shown in FIG. 41, the dither matrix has a configuration in which a unit dither threshold matrix of, for example, 4×4 (to be simply referred to as "unit matrix" hereinafter) is repeatedly used regularly and performs the above-described processings to all input pixels. Further, a normal output apparatus, such as a printer, often outputs a pixel similar to a circle rather than a square pixel due to the process limitations of the apparatus. The output state in this case is shown in FIG. 42. When all pixels are printed, the shapes of the printed pixels are designed to be ones completely covering ideal square pixels, i.e., circles with a diameter equal to or larger than √2 times as large as a resolution pitch like dot "1" shown in FIG. 42.

On the other hand, in the multi-level dither processing, it is necessary to consider not only a plane threshold array in the above-stated basic dither matrix but also depth (pixel level) direction. For example, in case of conducting a multi-level, e.g., N-level dither processing, (N−1) threshold planes are required. Dither thresholds on each of the threshold planes are compared with input tone levels, to thereby obtain an N-level output image. The state of this multi-level dither processing is shown in FIG. 43 and the state of output dots is shown in FIG. 44. FIGS. 43 and 44 show multi-level outputs including 0 (white).

Normally, in the dither processing, a high-quality image can be obtained if there is some sort of correlation among thresholds on a threshold plane and that among threshold planes. Accordingly, thresholds in (N−1) dither matrixes are often calculated automatically based on a reference threshold array indicating such correlation.

In the multi-level dither processing taking account of this correlation among planes, there are roughly two sequences of threshold arrays extending over the respective planes as shown in FIGS. 45A and 45B. To simplify description, FIGS. 45A and 45B show a multi-level dither processing for converting input 8-bit image data into an image of four levels per pixel (2 bits) using a 2×2 reference threshold array. FIG. 45C shows the reference threshold array. This reference threshold array indicates the order of the magnitudes of thresholds arranged on a threshold plane.

The sequence shown in FIG. 45A is to determine thresholds sequentially from the first plane. For example, all thresholds on the first plane are determined and then those on the second plane are determined. In conducting a dither processing using such threshold planes, if tone level "100" is input, for example, a pixel at a position corresponding to "1" of FIG. 45C is judged to have a tone level 2, a pixel at a position corresponding to "2" is judged to have a tone level 1, a pixel at a position corresponding to "3" is judged to have a tone level 1 and a pixel at a position corresponding to "4" is judged to have a tone level 1.

This sequence is used in a printer such as an ink jet printer, which is basically less influenced by the appearance state, i.e., presence/absence of neighboring pixels or tone levels thereof and which can stably form an image out of independent pixels. The resolution of an image output using this sequence is very high and almost comparable to that of a printer engine. Thus, this sequence is ideal for reproducing an image by means of area modulation. However, if an input image has a uniform tone level, pixels of the same or similar size are easily filled to form an output image. Due to this, the image is susceptible to the print position accuracy or the printing accuracy, such as dot size accuracy, of the apparatus.

In the sequence shown in FIG. 45B, thresholds at corresponding positions on planes are sequentially determined from the first to the third planes. For example, thresholds at a position corresponding to "1" shown in FIG. 45C, i.e., "20" on the first plane, "39" on the second plane and "59" on the third plane are determined, and then thresholds on the first to third planes at positions corresponding to "2" shown in FIG. 45C are determined. In conducting a dither processing using these threshold planes, if tone level "100" is input, for example, a pixel at a position corresponding to "1" of FIG. 45C is judged to have tone level 3, a pixel at a position corresponding to "2" is judged to have a tone level 2, a pixel at a position corresponding to "3" is judged to have a tone level 0 and a pixel at a position corresponding to "4" is judged to have a tone level 0.

This sequence is used in a printer, such as a laser printer and a thermal printer, which tends to be influenced by the appearance state of neighboring pixels and for which it is difficult and unstable to form an image out of independent pixels. With this sequence, a printed image has low resolution and low dot concentration. If a dither threshold array is formed as a dot concentrate type array, i.e., formed such that a plurality of dots are printed in block, an image called a mesh-dot image is formed. This mesh-dot image represents an image having points orderly arranged like a mesh while the block of dots constitute one point. Since the printer of this type is low in resolution, minor print position error in units of pixels is inconspicuous.

In either of the above two examples, all the thresholds arranged on the respective planes are automatically calculated when the reference threshold array and the threshold sequence among planes in depth direction are defined.

Next, consideration will be given to the relationship between the mechanical accuracy and printing accuracy such as print position, print size and the like of a plurality of recording elements constituting a recording head in a printer provided with the recording head as in the case of the ink jet printer. In case of the ink jet printer, for example, the volume and accuracy of the jetting direction of ink discharged from nozzles serving as recording elements, normally differs according to the nozzles. Although it is possible to enhance this printing accuracy to the extent that image quality is not adversely influenced all, production cost disadvantageously rises.

Further, if the print head is slightly shifted in main scanning direction and images are formed on the same paper sheet a plurality of times to thereby realize a higher resolution than that corresponding to the distance between the recording elements, the positions of the images to be formed may be possibly shifted from their respective target positions. To completely correct the shifts requires quite high accuracy in mechanical control, which again disadvantageously pushes up cost.

If the discharge volume and discharge direction of ink vary with nozzles, such an image as shown in FIG. 46 is output. Namely, FIG. 46 shows an image if all of the recording elements are driven based on the same tone level. As shown therein, a portion having a large dot (nozzle) and that to which neighboring dots are closer, are higher in concentration than the other portions and a black stripe occurs. Also, a portion having a small dot (nozzle) and that to which neighboring dots are more distant are lower in concentration than the other portions and a white strip occurs. As can be seen, if the discharge volume and discharge direction of ink vary with nozzles, concentration becomes uneven, resulting in the deterioration of image quality.

To avoid this, there is adopted a method, such as checked, thinning printing, of alternately printing lines in the same sub-scanning direction with a plurality of different nozzles without printing them with the same nozzle and thereby reducing the unevenness of concentration and the influence of stripes. According to this method, it is expected that the unevenness of concentration in the form of stripes can be reduced compared with a case where no countermeasures are taken. This method, however, has disadvantage of delaying printing speed proportionately with the complexity of the printing method.

Further, according to an image forming apparatus capable of expressing one pixel with a plurality of tones by modulating an area for printing one pixel while using multi-level image data, the unevenness of concentration due to printing error is inconspicuous in a relatively highlighted part (i.e., a region having small diameter dots and low concentration). However, if an image of a uniform tone level is reproduced on one plane with dots of medium or larger size to the extent that neighboring dots are almost in contact with one another, the unevenness of concentration in the form of stripes becomes particularly conspicuous. That is to say, a white stripe occurs to a portion from which neighboring dots are distant, whereas a deep stripe occurs to a portion in which dots overlap with one another. As for human visibility, in particular, the visible sensitivity of horizontal and perpendicular direction is very high. For that reason, it is quite likely that the unevenness of concentration in the form of stripes in horizontal and perpendicular directions are recognized as such even with slight positional error.

Furthermore, as for the formation of a color image, the tone reproduction characteristic comparable to the quality of a photograph including a highlight becomes increasingly important in recent color printers. The reproduction of tones capable of further reducing graininess is one of the most important technical challenges among others. Graininess indicates the degree of roughness in a printed image. A good graininess image indicates an image which tones change uniformly or smoothly and a bad graininess image indicates an image having conspicuous dots or roughness.

As a technique for satisfying the graininess, there is proposed a method of reducing the graininess of a highlight using thin ink colors, e.g., light cyan and light magenta beside standard four ink colors of C (cyan), M (magenta), Y (yellow) and K (black). With this method, however, the number of recording heads and driving mechanisms increase proportionately to the number of added ink colors. If a recording head has the same number of nozzles as that of pixels on a line per color, this disadvantageously leads to cost hike.

Moreover, color printing is faced by a problem of the unevenness of colors due to slight difference in the overlapping manner of the respective colors of C, M, Y and K. As for the four color printing of C, M, Y and K, various multi-level dither methods including dispersion dither methods represented by a halftone dot dither method and a Bayer dither method employing screen angles, a cluster dither method having intermediate characteristics between that of the dispersion dither method and the Bayer dither method and the like, have been developed.

For example, if the halftone dot method employing screen angles is applied to dithering, colors interfere with one another to thereby cause moiré such as roseate moiré. If a dispersion dither matrix such as a conventional Bayer matrix is employed, conspicuous texture appears at a specific tone part due to the low degree of freedom for the arrangement of dots. As can be seen, many problems still remain unsolved before obtaining optimum output characteristics over the entire colors or tones.

These problems with dither processing occur to both a binary output printer and a multi-level output printer employing a dither matrix. While the problems are particularly serious in the dither processing of the threshold sequence shown in FIG. 45B, they are not completely solved in the dither processing of the threshold sequence shown in FIG. 45A, either.

Additionally, while this is common to all these ordered dither processings including a cluster dither processing, periodicity tends to be easily seen over the entire tone ranges of input image data. The periodicity is particularly conspicuous in a printer with relatively low resolution.

Recently, a processing method of realizing output characteristics comparable to that of the error diffusion processing at as high speed as that of the ordered dither processing by employing fixed mask dither improved from the stochastic dither or cluster dither, is being developed. One preferred example of this method is described in Robert Unichney, "The Void-and-Cluster Method for Dither Array Generation", SPIE/IS&T Symposium on Electronic Imaging Science and Technology, San Jose, Calif., February 1993. This processing method, however, assumes only theoretical output characteristics in an ideal system and it considers the dot overlapping model of a binary printer, i.e., the manner in which neighboring dots overlap with one another at best. According to this processing method, therefore, only the improvement of output characteristics can be expected.

BRIEF SUMMARY OF THE INVENTION

It is, therefore, an object of the present invention to provide an image processor and a color image processor capable of preventing the deterioration of tone reproducibility due to occurrence of unevenness of concentration and stripes derived from the print position error of image output means such as a printer.

It is another object of the present invention to provide a color image processor capable of suppressing unevenness of colors and maintaining high tone reproducibility.

According to the present invention, threshold to be arranged on a plurality of dither threshold planes are determined in view of printing position accuracy and dot sizes relative to output tone levels, i.e., output characteristics, such as tone characteristics, different according to various output apparatuses.

According to one aspect of the present invention, there is provided an image processor for converting input image data having a first number of tones into image data of a second number of tones lower than the first number by a halftone processing and for outputting an image corresponding to the image data, the image processor comprising:

halftone processing means for halftone-processing the input image data using a dither threshold plane and for providing the halftone-processed image data; and image output means for outputting an image corresponding to the halftone-processed image data provided from the halftone processing means, the image processing means having different output position accuracies between a main scan direction and a sub-scan direction. According to this image processor, the dither threshold plane comprises a plurality of same size unit threshold matrixes; a relatively medium to high thresholds array in a threshold range of reference threshold array which determines thresholds in the unit threshold matrix, is an aperiodic array in the unit threshold matrix and an anisotropic array having neighboring thresholds in a direction coincident with a direction in which the output position accuracy of the image output means is relatively low, having close values. With this configuration, the image output section outputs an image having serial medium and high tone dots in the scan direction.

Even if the print position accuracy of a printer in, for example, the main scan direction is low, dots are printed serially on a paper sheet in the main scan direction and print position error is, therefore, compensated. Namely, the present invention provides an image processor capable of suppressing occurrence of unevenness of concentration and stripes derived from print position error and capable of maintaining high tone reproducibility.

According to another aspect of the present invention, there is provided a color image processor comprising: halftone processing means for halftone-processing the input image data using a dither threshold plane and for providing the halftone-processed image data; and color image output means for outputting an image corresponding to the halftone-processed image data provided from the halftone processing means, the color image output means having different output position accuracies between a main scan direction and a sub-scan direction. According to this image processor, the dither threshold plane comprises a plurality of same size unit threshold matrixes; in respect of at least two types of color components, an array of relatively medium to high thresholds in a threshold range of reference threshold array which determines thresholds in the unit threshold matrix, is an aperiodic array in the unit threshold matrix and is an anisotropic array having neighboring thresholds in a direction coincident with a scan direction in which the output position accuracy of the image output means is relatively low, having close values; and a threshold array in respect of color components other than the two color components is a periodic and ordered array in the unit threshold matrix in an entire threshold range. With this configuration, the image output section outputs a color image having serial medium and high tone dots in the scan direction.

The color input image data contains a yellow component. Serial thresholds are arranged to extend over the plurality of dither threshold planes for respective colors. The number of the dither threshold planes for the yellow component over which the serial thresholds extend is the largest of all other color components, whereby types of output dot sizes for the yellow component are more than those for the other color components.

The output pattern for the color Y which is least conspicuous visually is constituted by various sizes of dots. Accordingly, even if the print position accuracy of the printer is low and the manner in which yellow overlaps with other colors partially differs, the image is compensated so that the area of regions in which two color dots overlap becomes stochastically constant over the entire image. That is, a color image processor capable of suppressing unevenness of colors and maintaining high tone reproducibility is provided.

Moreover, according to the present invention, it is possible to enhance tone reproducibility and to provide a simplified configuration of the processor by introducing gamma correction characteristics to a plurality of threshold planes.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 7A to 7C show examples of sequences of threshold planes;

FIGS. 9A to 9D show an example of pixel growth in the sequence of FIG. 7A;

FIGS. 13A to 13C show dot reproduction with the respective dither thresholds of the present invention;

FIGS. 17A and 17B show another example of pixel growth using the threshold sequence of the present invention;

FIG. 18 shows an example of the threshold sequence of the present invention;

FIGS. 19A and 19B show modified examples of the threshold sequence shown in FIG. 18;

FIG. 20 shows yet another example of the threshold sequence of the present invention;

FIGS. 21A and 21B show other examples of the threshold sequence of the present invention;

FIGS. 23A to 23D show various output patterns including printing position error;

FIGS. 27A to 27C show orders of priority among the entire threshold planes and arrangement states of gamma-corrected thresholds in the embodiment;

FIG. 28 shows dot arrangement relationship in low tone parts among respective colors according to the present invention;

FIGS. 29A and 29B show print position relationship among respective colors when using a color printer;

FIG. 30 is an explanatory view for a well-known screen angle processing;

FIGS. 31A and 31B show positional shifts of color dots between two colors;

FIGS. 32A and 32B show positional shifts of dots between two colors;

FIGS. 37A to 37C show other examples of threshold sequences for the multi-level dither processing of the present invention;

FIGS. 38A and 38B show other examples of dot arrangement patterns;

FIGS. 39A and 39B show other examples of threshold sequences for the multi-level dither processing of the present invention;

DETAILED DESCRIPTION OF THE INVENTION

Description will be given hereinafter to embodiments in which the present invention is applied to a color ink jet printer, with reference to the accompanying drawings.

Figure 1:
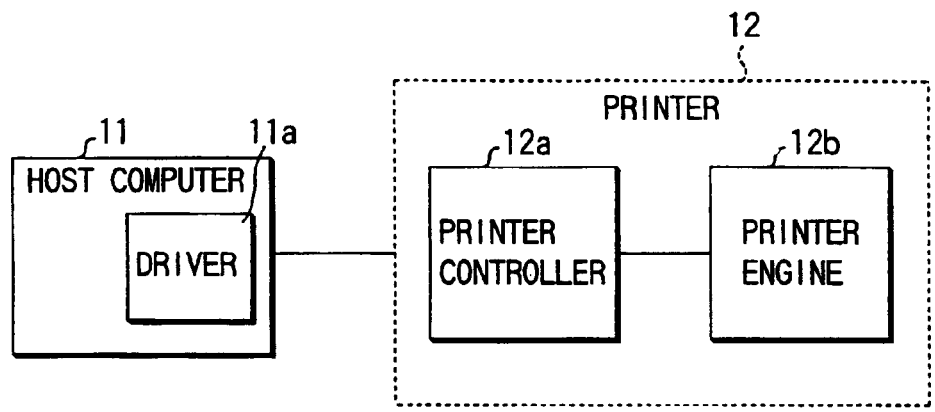
FIG. 1 is a schematic block diagram showing the hardware configuration of a printer to which the present invention is applied.

FIG. 1 is a block diagram showing the overall hardware configuration of the present apparatus. Color image data of M tones per pixel is transferred from a host computer 11 to a printer 12. Namely, the host computer 11 transfers encoded image data (or raster data) from a driver 11a to a printer controller 12a of the printer 12.

The printer controller 12a decodes the encoded image data, e.g., a page description language such as PDL, transferred from the host computer 11, to bitmap data and conducts various image processings before storing the processed data in an image memory included therein. The printer controller 12a transfers the image data processed by the printer engine 12b and controls the printing operation of the printer engine 12b.

The printer engine 12b converts the bitmap image data processed by the printer controller 12a into a drive signal to thereby drive a color ink jet head and, at the same time, carries a paper sheet to print the image on the sheet.

It is noted that the host computer 11 and the printer 12 do not necessarily have one-by-one relationship. If the printer 12 is used as a network printer in a network recently spread, a plurality of host computers 11 are prepared for a single printer 12.

Figure 2:
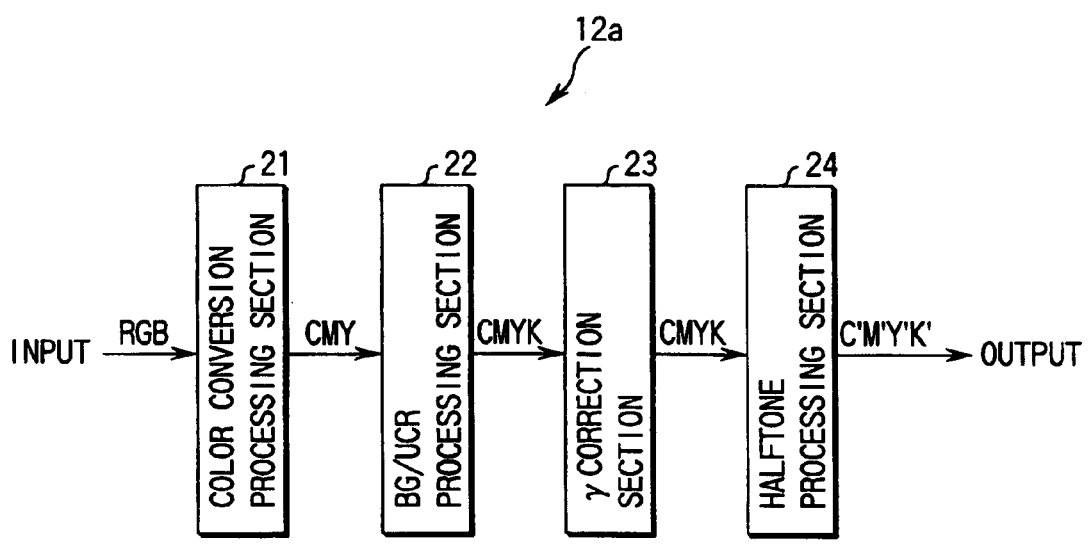
FIG. 2 is a block diagram showing the configuration of an image processing section provided in a printer controller shown in FIG. 1.

FIG. 2 is a block diagram showing an example of the configuration of an image processing section in the printer controller 12a. This image processing section consists of a color conversion processing section 21, a BG/UCR processing section 22, a gamma (γ) correction section 23 and a halftone processing section 24. The color conversion processing section 21 converts an input standard RGB-color signal having colors each represented by 8 bits into CMY colors for reproducing printer colors and supplies the CMY colors to the BG/UCR processing section 22. R, G and B denote red, green and blue, respectively and C, M and Y denote cyan, magenta and yellow, respectively.

The BG/UCR processing section 22 extracts a black component from CMY colors, determines CMY colors after extraction and supplies CMYK-color data to the gamma correction section 23. Symbol K denotes black.

The gamma correction section 23 corrects the concentration of the CMYX colors according to the actual output characteristics of the printer and supplies the concentration-corrected CMYK colors to the halftone processing section 24. The halftone processing section 24 subjects data of respective pixels to a multi-level dither processing for respective colors to thereby convert the pixel data into multi-level image data of lower tone level of about 2 to 4 bits for the respective colors so as to conform to the printing capability of the printer 12.

Figure 3:
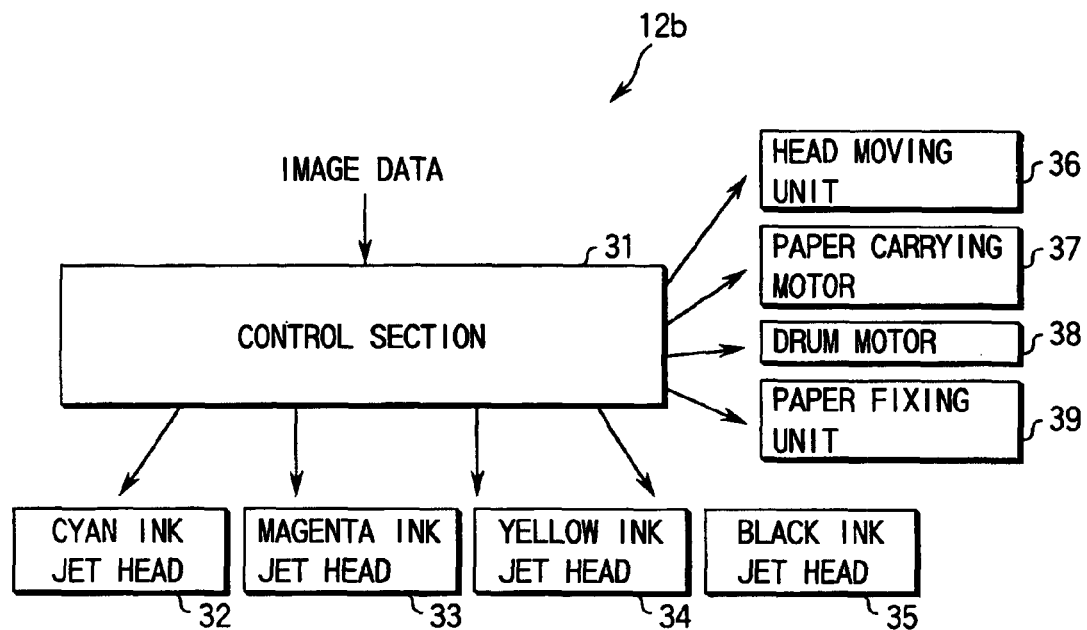
FIG. 3 is a schematic block diagram showing the configuration of a printer engine shown in FIG. 1.

FIG. 3 is a block diagram showing the hardware configuration of the printer engine 12b. A control section 31 drive-controls a cyan ink jet head 32, a magenta ink jet head 33, a yellow ink jet head 34 and a black ink jet head 35 based on multi-level image data of colors each represented by several bits from the printer controller 12a. The control section 32 also drive-controls a head moving unit 36 controlling the reciprocation of the respective heads 32 to 35 in the rotary shaft direction of a rotary drum, a paper carrying motor 37 carrying a sheet of printing paper to the rotary drum, a drum motor 38 rotating the rotary drum, and a paper fixing unit 39 provided with a charging roller for charging and fixing the printing paper wound around the rotary drum.

The printer engine 12b is provided with a reciprocation mechanism on which the heads 32 to 35 are mounted in the rotary shaft direction of the rotary drum. The printing paper carried by the paper carrying motor 37 is wound around the rotary drum and charged and fixed by the paper fixing unit 39. Thereafter, the drum motor 38 rotates the rotary drum. The respective ink jet heads 32 to 35 are driven based on printing data. When the rotary drum rotates once, the head moving unit 36 drives the reciprocation mechanism and the ink jet heads 32 to 35 are driven in the rotary shaft direction of the rotary drum by a half of the distance between ink discharge ports. When the ink jet heads 32 to 35 are driven based on the printing data and the rotary drum rotates twice, printing operation to one printing paper is completed. Thus, an image can be printed on the printing paper with a resolution twice as high as that corresponding to the ink discharge interval of the ink jet heads 32 to 35.

The halftone processing section 24 constitutes the important parts of the present invention. In this embodiment, description will be given to a case where the halftone processing section 24 conducts a halftone processing to input tone image data of, for example, 8 bits and 256 tones (0: white, 255: black) to convert the image data into data having colors each represented by 3 bits and 8 tones (0: white, 7: black). It is noted that the numbers of input and output tones should not be limited to the above numbers. It would be easily construed from the following description that the number of tones can be arbitrary.

Figure 4:
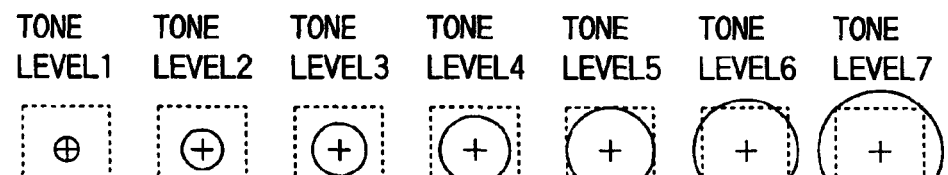
FIG. 4 shows dots sizes relative to respective tone levels.

The printer 12 outputs image data of colors each represented by 3 bits by conducting thereto a halftone processing. Namely, using seven types of variable dot sizes per pixel, eight tone levels including white can be reproduced within one pixel. FIG. 4 shows dot sizes for the respective tones levels, which are referred to as basic 8 tone characteristics.

While it is normally desirable that dot sizes are adjusted according to the respective tone levels, it is almost impossible to completely adjust them because of process restrictions. As for the ink jet printer, for example, it is relatively easier to make the discharge volume of each ink drop linearly proportionate to the image data than to linearly realize the brightness and density thereof with respect to input image data.

Further, it is also possible to attain target characteristics by adjusting the number of ink drops and drive waveforms corresponding to the respective tone levels. In this case, however, the drive waveforms tend to be complicated and cause redundant processing. Even if the basic 8 tone characteristics are adjusted to the target characteristics, it is unavoidable that output characteristics are shifted from a targeted, ideal tone curve while all of the 256 tones are reproduced by means of a halftone processing. Besides, these characteristics are greatly influenced by even the slight difference of the characteristics of paper to be used.

Accordingly, it is the easiest method to provide a configuration as simple as possible to the extent that tone characteristics are not largely distorted in a design and to correct the printing characteristics of the printer engine by conducting gamma correction and the like. If adopting this method, the dot size of at least the highest tone is that of a circle with a diameter large enough to completely cover a square pixel corresponding to the resolution of the printer engine.

Figures 5, 6:
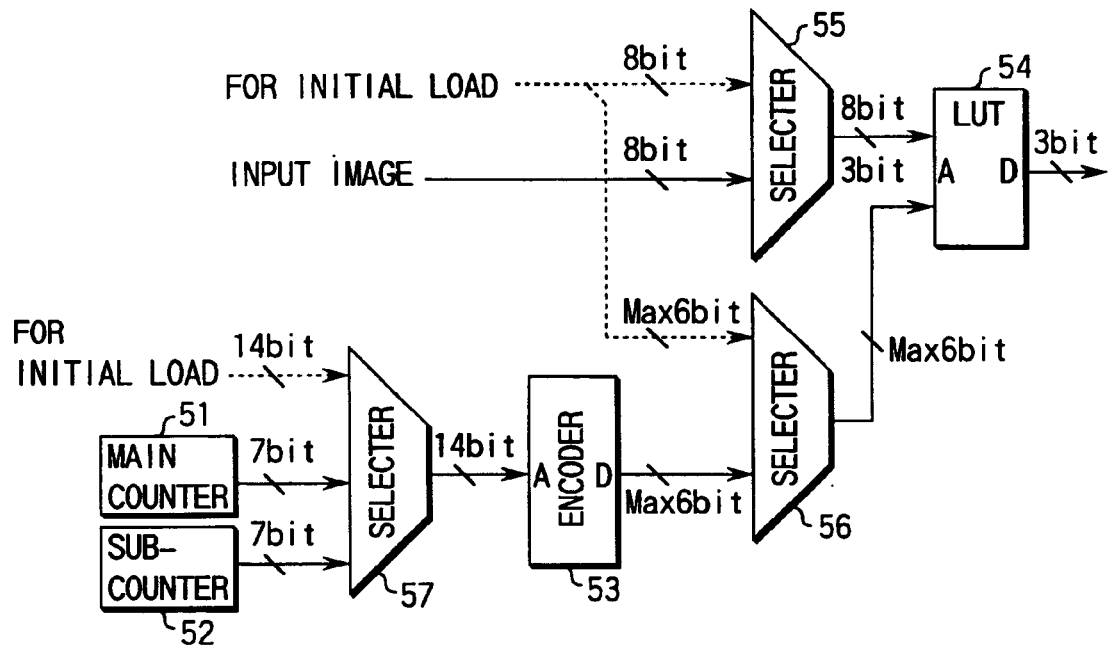
FIG. 5 is a block diagram showing the configuration of a halftone processing section shown in FIG. 3.
FIG. 6 shows a reference threshold array.

The halftone processing section 24 conducts a multi-level dither processing. The basic hardware configuration of the halftone processing section 24 is shown in FIG. 5. It is noted that the configuration of the section to realize the multi-level dither processing may be basically, freely chosen and that that shown in FIG. 5 is only one example.

A main counter 51 generates a main scan direction address of a unit matrix which has a size of, for example, 128. A sub-counter 52 generates a sub-scan direction address of a unit matrix which has a size of, for example, 128.

A selector 57 supplies thresholds in a reference threshold array to an encoder 53 when, for example, power is turned on. During the dither processing, the selector 57 supplies the count values of the main counter 51 and the sub-counter 52 to the encoder 53.

The encoder 53 outputs values (maximum 6 bits) corresponding to positions indicated by the counter values input from the main counter 51 and the sub-counter 52 based on the reference threshold array. Here, the reason the output of the encoder 53 needs to be 6 bits will be described. If input image data of 8 bits and 256 tones is converted to data of 3 bits and 8 tones by a halftone processing, the number of planes used is (8−1) or seven. If the largest number of thresholds used per plane is assumed as "x", the following formula is established:

$$256/\{x*(8-1)+1\} \geq 1, \therefore x \leq 36.$$

The above formula shows that the reference thresholds can be expressed with 6 bits if the input data of 256 tones is converted into data of 8 tones by the multi-level dither processing. The basic hardware configuration of the encoder 53 is easily realized by using RAM and the like.

The result of the comparison between the 8-bit input data and the thresholds on the threshold plane, i.e., output tones are obtained in advance and supplied to an LUT (Look-up Table) 54 through selectors 55 and 56 when, for example, power is turned on. The selector 56 supplies the output data of the encoder 53 to the LUT 54.

The LUT 54 inputs the encoded data of maximum 6 bits (reference thresholds) and the input image data of 8 bits and 256 tones as address data, and outputs tones corresponding to the input image data as data of 3 bits and 8 tones. The LUT 54 consists of RAM and the like.

In the halftone processing section 24 constituted as stated above, the number of tones of dots to be printed is 8 but the section 24 can express halftones of up to 256. If the encoder 53 and LUT 54 are constituted of RAM and the like, a reference threshold array as shown in, for example, FIG. 6 is always determined first and stored in the encoder 53 through the selector 57. Next, the thresholds on seven planes are calculated based on this reference threshold array and the threshold array extending over the planes. Further, the dither processing result obtained by comparing the input image data of colors each having 8 bits and the thresholds on the planes at positions corresponding to the input data, is calculated. The calculation result is shown as a table and initially loaded to the LUT 54 through the selectors 55 and 56. Consequently, it is possible to conduct a multi-level dither processing employing an arbitrary threshold array.

Next, a sequence algorithm for a multi-level dither processing, that is, a threshold array determination method will be described with reference to FIGS. 6 and 7. To simplify description, FIGS. 6 and 7 show a dithering threshold array of very small size.

FIG. 6 shows a reference threshold array, and thresholds increase in this order on planes. This threshold array is a screw-type dither matrix having a screen angle of 45 degrees. In case of outputting data of eight tones as in this embodiment, seven planes are required. If eight types of thresholds are used on each plane as shown in FIG. 6, the number of halftones is 8 (tone)×7 (planes)+1 (white)=57, which number is smaller than that of an actual case. However, for brevity, the configuration of 57 tones will be described. It is noted that the basic processing configuration remains unchanged even if the number of tones increases.

In case of the reference threshold array shown in FIG. 6, the number of bits of the main counter 51 and the sub-counter 52 shown in FIG. 5 is 2 bits, respectively. Based on the 3-bit data obtained by encoding the output values of these counters in the encoder 53 and the input image data, the LUT 54 outputs the multi-level dither processing result as 3-bit image data.

FIGS. 7A to 7C show sequences of threshold arrays in depth direction, i.e., pixel level direction if the array shown in FIG. 6 is used as a reference threshold array. The thresholds are not normalized to 0 to 255 and indicated as a simple sequence of thresholds. In FIG. 6, if "56" is normalized, it corresponds to "255". In FIGS. 7A, 7B and 7C, the uppermost column indicate reference thresholds and the left most rows indicate threshold plane numbers.

Figure 8A:
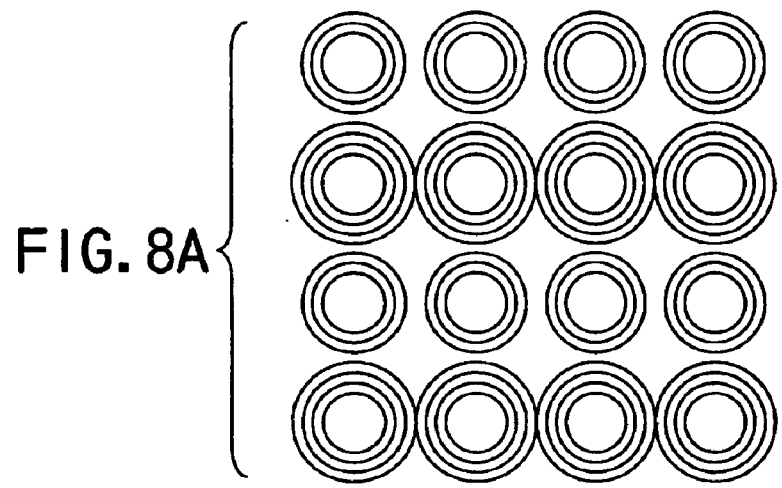
FIGS. 8A to 8C shows output examples of a multi-level dither processing using the sequences of FIGS. 7A to 7C, respectively.
Figure 8B:
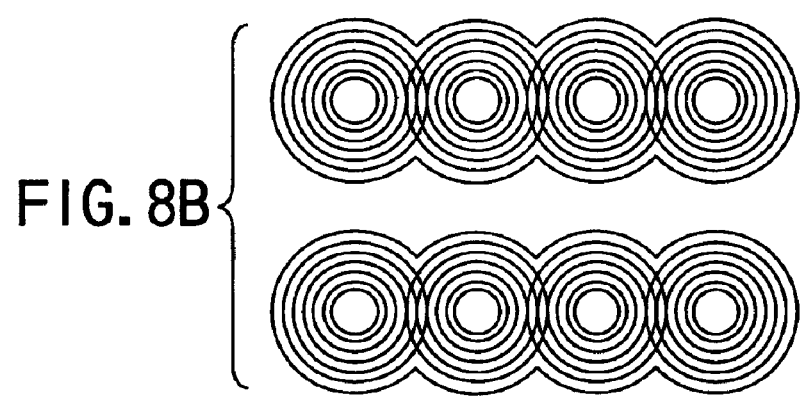
Figure 8C:
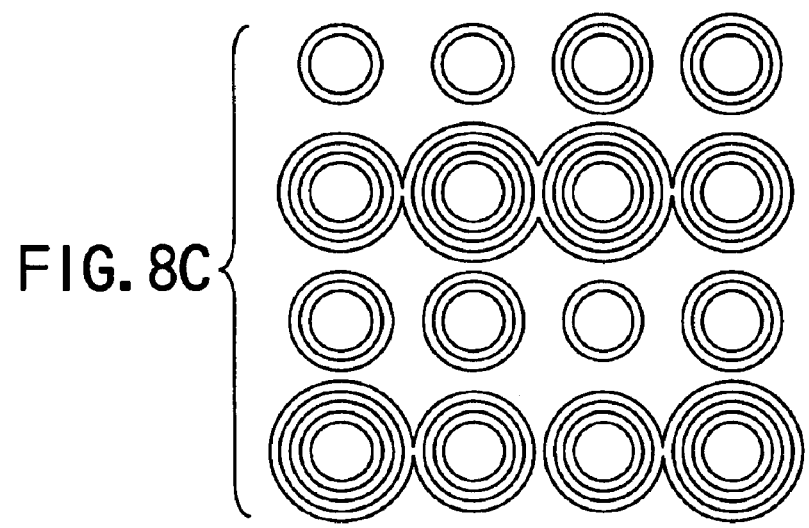
Figure 45A:
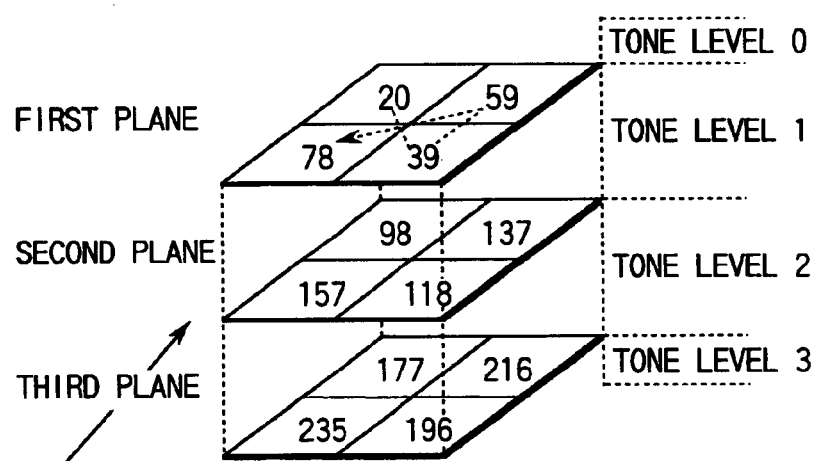
FIGS. 45A to 45C show a sequence of the multi-level dither processing.
Figure 45C:
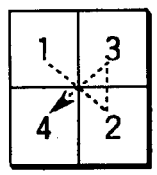
Figure 45B:
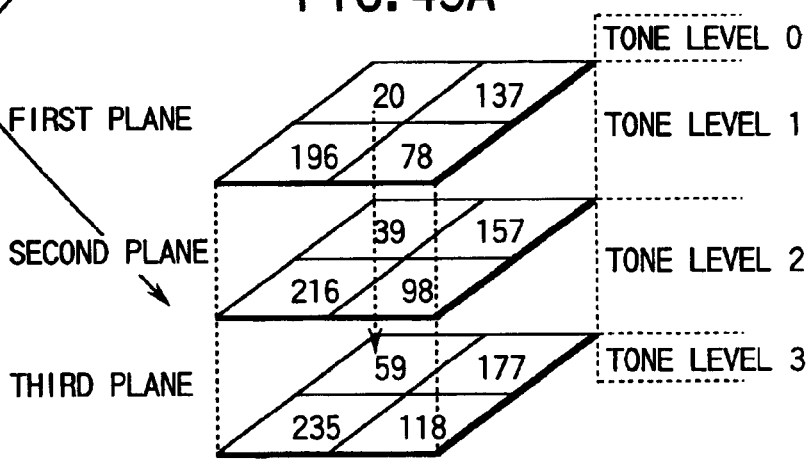
Figure 46:
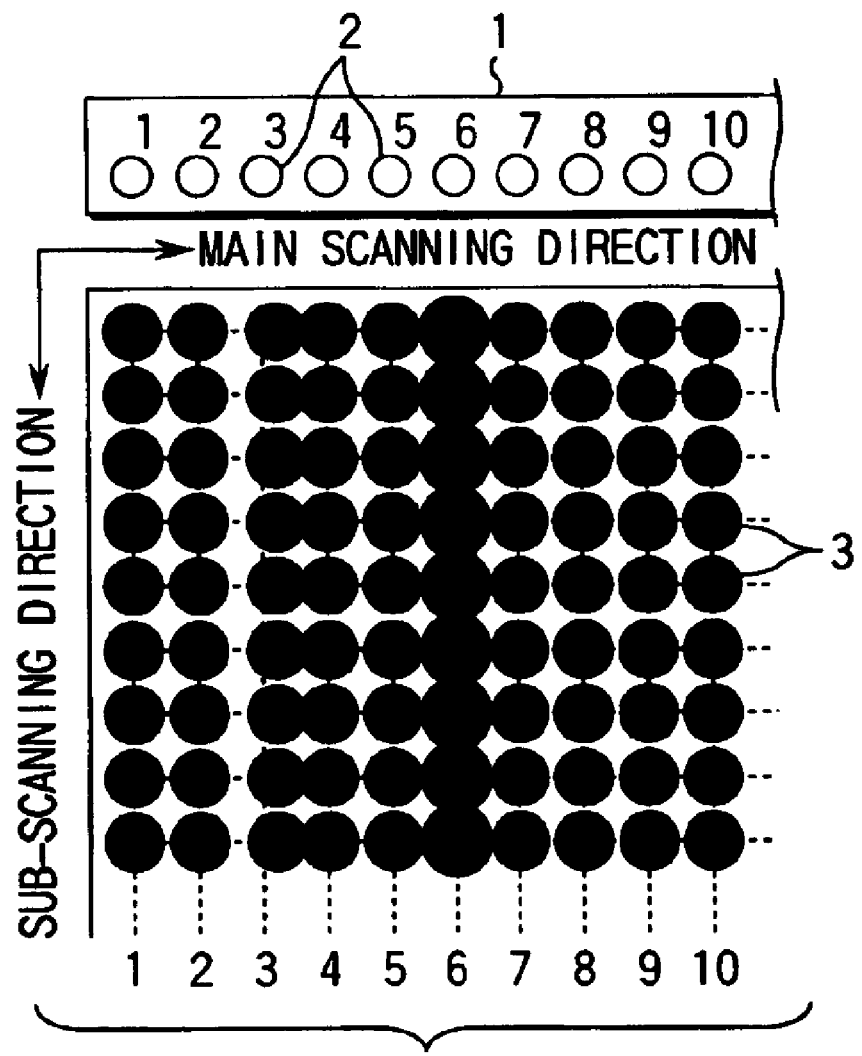
FIG. 46 shows an example of unevenness of printing by a conventional line recording head.

First, the threshold arrays among planes shown in FIG. 7A are the same in sequence as those shown in FIG. 45A. The arrays are susceptible to the printing error of the printer engine and the problems of unevenness of density and vertical stripes tend to occur. The threshold arrays among planes shown in FIG. 7B are the same in sequence as those shown in FIG. 45B. The problem of unevenness of density and vertical stripes occur to the arrays less frequently but resolution disadvantageously decreases. Further, the threshold arrays among planes shown in FIG. 7C exhibit intermediate output characteristics between those in FIGS. 7A and 7B. FIGS. BA, 8B and BC show examples of printed input data of uniform halftones (corresponding to, for example, the threshold 28 of FIGS. 7A, 7B and 7C) when the data is subjected to a multi-level dither processing and printed using the threshold planes of FIGS. 7A to 7C, respectively. In FIGS. 8A, 8B and 8C, concentric circles indicate the number of ink drops corresponding to output tones levels (plane numbers). FIG. 8A shows the result of processing and printing the input data using the threshold planes of FIG. 7A. FIG. 8A shows the printing result using the threshold planes of FIG. 7B. FIG. 8C shows printing result using the threshold planes of FIG. 7C.

Now, description will be given to a method of realizing optimum image reproduction for a printer by combining sequences of a plurality of threshold planes. For brevity, the threshold sequence shown in FIG. 7A will be described.

In the output of the multi-level dither processing, it is only a low tone level part to which the first threshold plane is targeted, i.e., a highlight that includes a tone "0" in pixels to be printed among input image regions. FIGS. 9A to 9D show the growing process of output pixels when input uniform images whose tone level increases gradually are subjected to a dither processing using the threshold planes. When the processing is completed using the first threshold plane as shown in FIG. 9B, the tone level 1 is output for all pixels. When the processing is completed using the second threshold plane as shown in FIG. 9D, a tone level 2 is output for all pixels.

If the input image of a uniform tone level, e.g., a tone level 9 is processed, an output pattern shown in FIG. 9B is obtained. That is, in the tone part having a tone level of "9" or higher, dots of some sizes are output at all positions. The tone part has AM modulation (only amplitude is changed) output characteristics with spatial frequency of a relatively high constant value. In that case, the respective pixels change to be gradually grown to mesh-dot reference unit.

This dot reproduction system can obtain far higher quality images in terms of graininess than a dot reproduction system, such as a binary output printer in which periods of ON pixels are not constant.

Moreover, in the low tone parts (regions of thresholds of 8 or lower in FIG. 7A) in which tones are reproduced in an FM modulation manner, that is, periods of ON pixels are not constant, the size of dots corresponding to the resolution pitch of the printer and formed on paper is very small. Thus, it is possible to obtain an image of good graininess. It is noted that "a low, middle or high tone part" indicates a region having a low, middle or high tone level in an input image and/or output image throughout the specification.

Further, in case of a multi-level dither processing, the number of thresholds used per threshold plane is a value obtained by simply dividing the number of input tones by the number of planes if the sequence is that shown in FIG. 7A. In the multi-level dither processing conducted to output eight tones, for example, the number of thresholds used per threshold plane is 256/(8−1)≈36. If an optimum threshold plane is designed using the 36 thresholds, the remaining threshold planes can be determined in the same manner. Accordingly, compared with a binary dither processing which employs 256 thresholds, which does not have periodicity and which requires designing one threshold plane, or reference thresholds, so as not to generate texture, the multi-level dither processing allows designing threshold planes easily.

As in the case of this example, in the output apparatus capable of forming multi-level images, the size of a small dot, i.e., a dot of a tone level 1 to that of a dot of several tone levels are smaller than the resolution pitch of the printer, so that neighboring dots do not contact with one another as shown in FIG. 4. With dots of such tone levels, a visually preferable image is printed if a pattern is designed so that dots are dispersed as much as possible. This is because blank portions (gaps between dots) are dispersed. At this moment, it is more preferable to design a pattern so that the dither threshold array is not seen as a repeated pattern.

In an actual printer, however, mechanical and physical accuracies are hardly manufactured in exactly the same manner on a two-dimensional plane in both main scan and sub-scan directions. Normally, due to the architecture of the printer, one accuracy is inferior to the other. In case of an ink jet printer, accuracy in main scan direction is lower due to the unevenness of the volume and discharge direction of ink discharged from ink discharge ports serving as recording elements.

If so, neighboring pixels overlap with one another in the sub-scan direction of a printed image and deep stripes occur or neighboring pixels are away from one another to thereby generate white stripes. In the low tone part in which neighboring dots are originally distant, these stripes are relatively inconspicuous. With the dot size in middle to high tone parts in which neighboring dots almost contact with one another, such stripes are most conspicuous.

Figure 10:
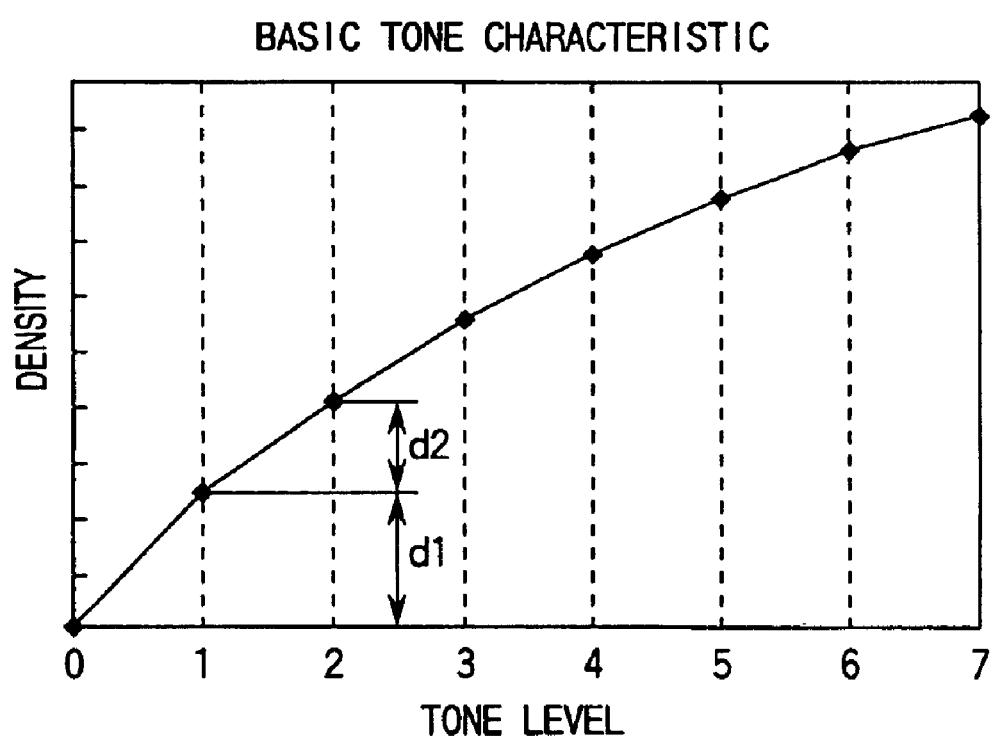
FIG. 10 is a graph showing the basic tone characteristics of a multi-level dither processing.

Further, if the size of the dot of the maximum tone level 7 is set to at least completely cover a square pixel corresponding to the resolution, dots of respective tone levels have the characteristics shown in FIG. 10. FIG. 10. shows the result of measuring density while the dots of the same sizes corresponding to the respective tone levels are printed on the entire paper sheet. The density characteristics with respect to the tone levels are referred to as "basic tone characteristics". As can be seen from FIG. 10, the density difference d1 from the density at a tone level 0 to that at tone level 1 is larger than that between other neighboring tone levels such as d2. Therefore, the low tone parts, quite important to reproduce tones, tend to have normally a large density change and low tone resolution.

Next, the dither threshold array according to the present invention will be described with reference to FIGS. 11A and 11B. The dither threshold array is used to subject input image data of 8 bits and 256 tones (0: white, 255: black) to a halftone processing to thereby convert the input data into data of 3 bits and 8 tones (0: white, 7: black). Symbol A2 in FIG. 11A denotes a unit matrix which size is 30×30. This size is reference threshold matrix size. Symbol A1 denotes a sub-matrix and the array of 1 to 4 low thresholds in the sub-matrix A1 is a part of a reference threshold array. The reference threshold array in the sub-matrix Al is repeatedly used in the unit matrix A2.

Here, if input image data of 8 bits and 256 tones is converted into data of 3 bits and 8 tones by the halftone processing, the number of planes used is (8−1)=7. If the maximum number of thresholds used per plane is assumed as "x", the following formula is established:

$$256/(x*(8-1)+1) \leq 1 \therefore x \geq 36.$$

Namely, for seven threshold planes, the number of thresholds per plane is 36. In other words, there exist 36 output patterns (dot array patterns) corresponding to 36 tones on one plane. For reference, on the entire threshold planes at this moment, there exist output patterns corresponding to 36*7+1 (white)=253 tones.

If the 36 tones are formed in a matrix, 6×6 matrix is provided. As shown in FIG. 11A, the unit matrix A2 of 30×30 is large enough to contain five sub-matrixes of 6×6 in main scan direction and five in sub-scan direction. If the size of the unit matrix is set to be an integer multiple of that of the sub-matrix, the unit matrixes can be smoothly, conveniently coupled.

Next, the manner in which the reference thresholds are arranged will be described while using numeric values shown in FIG. 11A. It is noted that blank portions in the threshold matrix indicate parts occupied by numeric values of 5 or higher. Further, in a multi-level dither processing employing a plurality of threshold planes, pixels at positions corresponding to the thresholds are sequentially turned on from low to high thresholds. "Turned on" means that data of a tone level other than "0" is output from the LUT 54 of the halftone processing section 24 shown in FIG. 5.

Figure 11A:
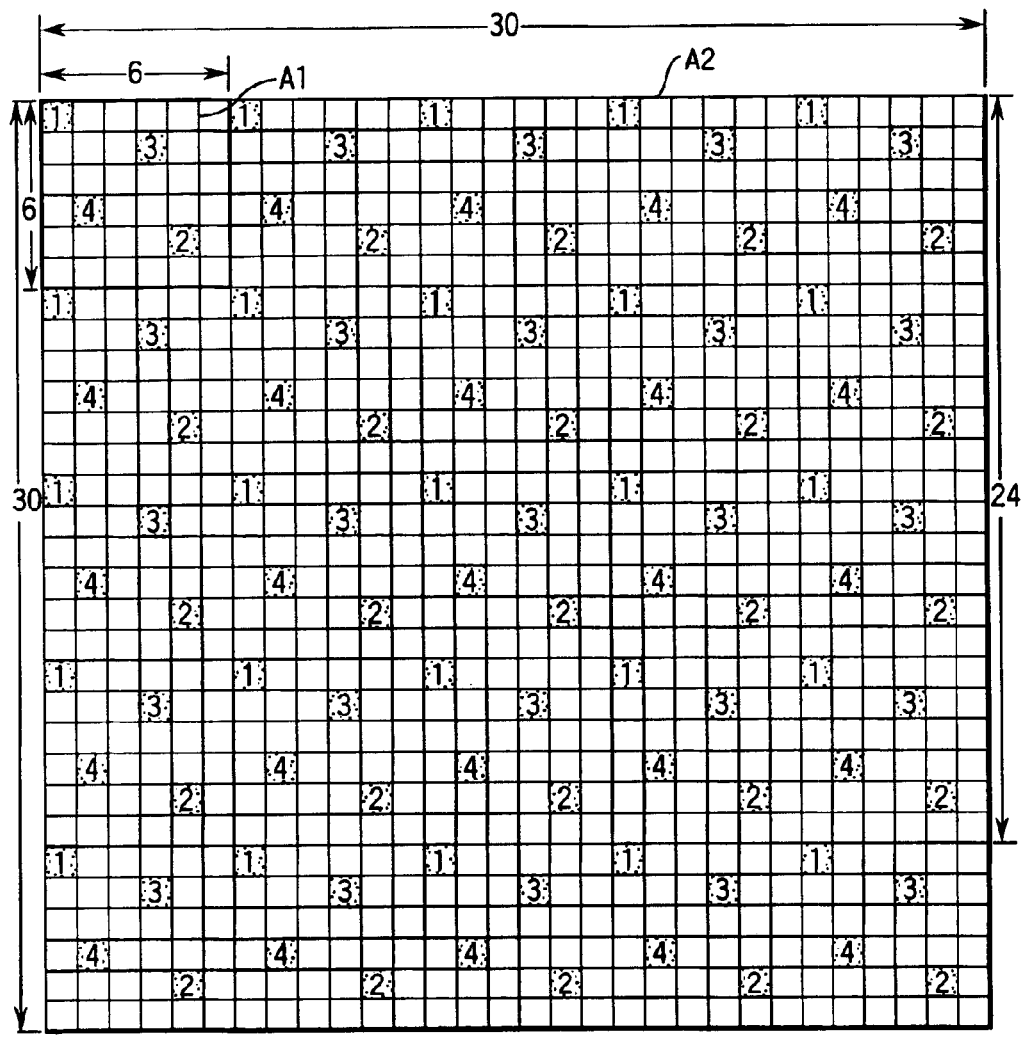
FIGS. 11A and 11B show the reference threshold array of the present invention.
Figure 11B:
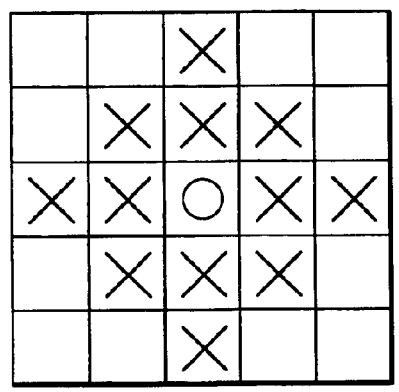

As shown in FIG. 11A, a plurality of sub-matrixes have the same low threshold array. That is to say, low thresholds are periodically arranged in the unit matrix. The low thresholds are 1 to 4 in this embodiment. Further, the low threshold array is designed so that threshold parts are not arranged closely in horizontal or vertical direction. This makes it possible to realize the reproduction of tones periodically, visually inconspicuously and smoothly in the low tone parts. Further, the distance between the neighboring low threshold parts is larger than two pixels as shown in FIG. 11B. In FIG. 11B, a circle at the center is a low threshold of interest and thresholds of 1 to 4 are not arranged at positions marked "x". Also, in the low threshold array, low thresholds are not alternately arranged in either horizontal or perpendicular direction. The neighboring low thresholds are away from one another more than 2 pixels. By doing so, it is possible to prevent the deterioration of the graininess of the low tone parts.

Next, thresholds are occupied in blank portions in the matrix. Threshold values (in this example, thresholds of 5 to 36) are arranged aperiodically over a plurality of continuous sub-matrixes in relatively middle to high tone parts. As a result, aperiodic dot patterns are output in the middle tone parts to the high tone parts.

The easiest method to realize this arrangement is to determine the array of thresholds 5 to 36 at random. That is, the positions of thresholds are determined at random for each sub-matrix and thresholds are allotted to the determined positions in the order from low to high values. By doing so, it is possible to allot thresholds 1 to 36 over the entire unit matrix size.

Normally, the threshold pattern determined at random tends to constitute visually uncomfortable continuous planes (dot blocks) and to produce a noisy output image. In this embodiment, however, since the low thresholds are most uniformly dispersed and orderly arranged, and neighboring dots are out of contact except for those close to the highest level in a multi-level output printer, visually uncomfortable blocks are difficult to recognize compared with a case of binary output. Accordingly, even if middle to high thresholds are generated at random, visually uncomfortable output patterns are not generated.

Figure 12:
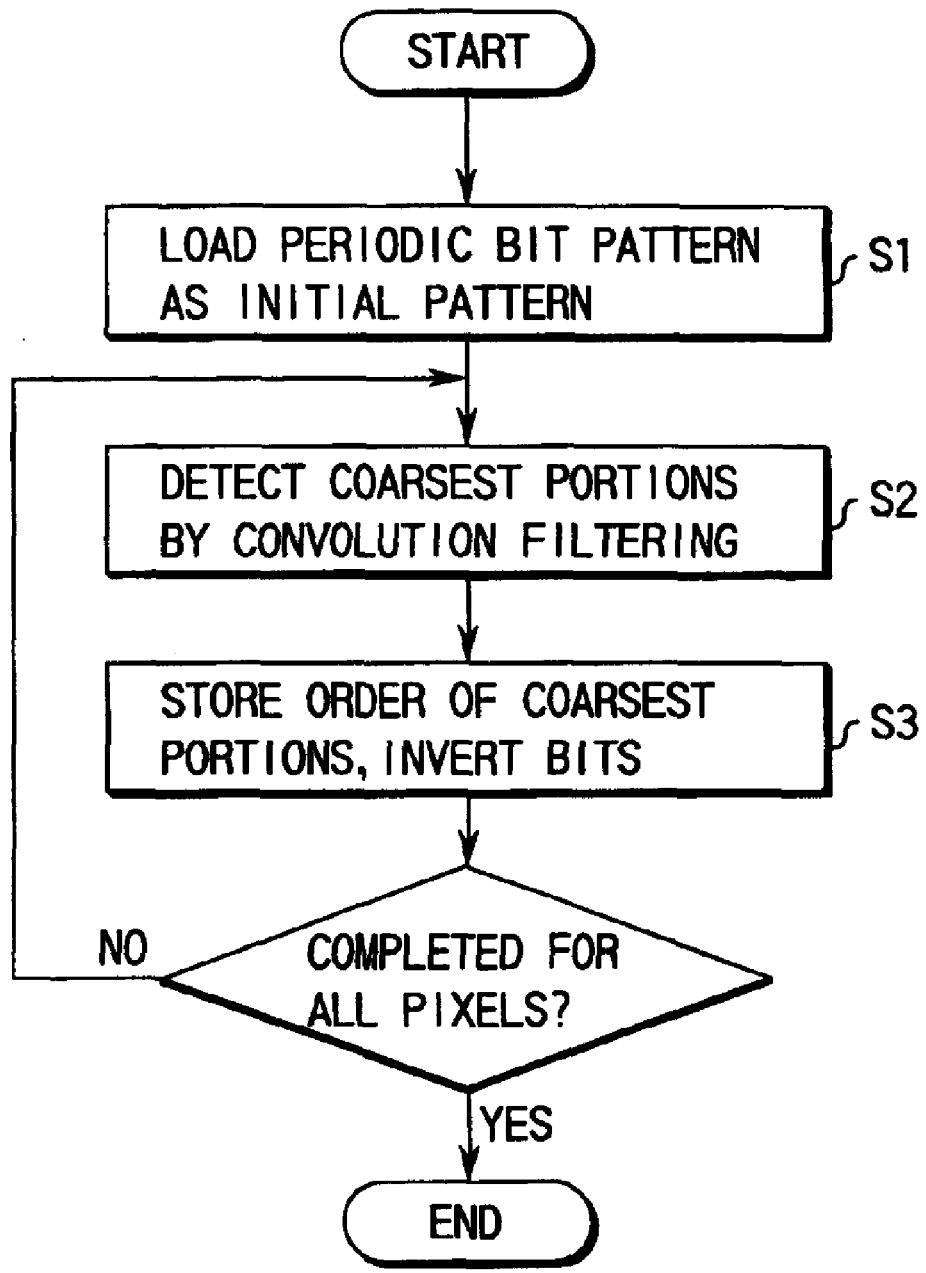
FIG. 12 is a flow chart showing the threshold generation processing of the present invention.

A more preferred method of obtaining the threshold array is to determine a portion having the highest dispersibility among the unit matrixes by convolution filtering while also referring to peripheral sub-matrixes. The processing is shown in the flow chart of FIG. 12.

First, in a step S1, it is assumed that portions denoted by thresholds 1 to 4 in FIG. 11A are determined, a bit pattern of 30×30 in size having the determined portions set at 1 and the remaining portions set at 0 is loaded as an initial pattern to the RAM. Next, in a step S2, the initial pattern is subjected to convolution filtering and the most coarse portion among portions having a initial pattern value of 0, i.e., the portions having the lowest value as a result of filtering operation are detected. It is discovered that an excellent output pattern can be obtained if a filter indicated by the following formula (1) is used as a preferred convolution filter at that moment.

$$Filter(i, j) \propto \exp\left[-\left\{\frac{i^2}{k_i^2} + \frac{j^2}{k_j^2}\right\}^n\right] \quad (1)$$

In formula (1), i is a convolution variable in main scan direction, j is a convolution variable in sub-scan direction and ki, kj and n are constants.

The optimum values of ki and kj are determined according to the diameter of a lowest tone level dot and the distance of dots actually printed. The optimum value of the exponential part n is determined according to the shape of dots, or particularly, the shape of a dot edge. The above formula is one example of an approximation calculation formula for patterning the optical characteristics, such as ink density, of ink dots printed on a paper sheet.

At calculation, a case where there are a plurality of portions having the same minimum value is assumed. This case tends to occur frequently since the initial pattern is a periodic ordered dither pattern. In this case, it is possible to randomly determine which portions to select or to select the first calculated portions.

Next, in a step S3, the order of the detected portions is stored. In this example, the target is not a sub-matrix unit but an entire matrix size and the order in the entire matrix size is determined. Further, a pattern in which bits at the determined positions are changed from 0 to 1 is generated. This processing is repeatedly carried out until a bit pattern of 0 is eliminated and the priority or order of all of the 30×30 pixels is determined. As for the priority, if the first priority is given to the low threshold parts (25×4=100) which have been already determined by the periodic pattern, priority are obtained from 101 to 900 in the above calculation. According to this priority, the thresholds 5 to 36 are allotted.

In case of a matrix of 30×30 in size, thresholds increase one by one at intervals of 25 matrix elements. That is, 25 elements have the same threshold. In this way, the positions of elements having remaining thresholds 5 to 36 are determined and the thresholds of all elements in the unit matrix of 30×30 in size are eventually determined.

According to this processing, thresholds are determined so that output dots are made continuous in the direction of relatively low printing accuracy out of the main scan direction and the sub-scan direction. Specifically, the weight of the filtering operation is changed relatively between the main scan direction and the sub-scan direction. In other words, a weight is added to both values ki and kj in the formula (1). For example, the relationship between ki and kj is set at ki<kj, thereby making it possible to generate a pattern which can be easily coupled in the main scan direction having low printing accuracy.

The coupling strength is preferably set optimum according to printing accuracy by changing the rate of ki and kj as shown in FIGS. 13A to 13C. FIG. 13A shows a case where ki=kj and thresholds are arranged isotropically. That is, the thresholds having similar size are arranged without directivity. FIG. 13B shows a case where ki<kj and thresholds are arranged anisotropically in main scan direction. That is, thresholds having similar sizes are arranged in main scan direction. FIG. 13C shows that ki is far larger than kj and that thresholds are arranged further anisotropically in main scan direction.

The reference threshold array thus generated anisotropically, does not have a large correction effect with respect to printing error on a single plane; however, by combining the array with sequences of a plurality of threshold planes, it is possible to greatly reduce unevenness of density and strips derived from printing error. It is noted that if a binary dither processing is conducted using this anisotropic threshold array in the binary printer, large dots relative to the resolution pitch are coupled one another at neighboring pixels, thereby making it difficult that unevenness of density and stripes take place. Accordingly, the binary dither processing exhibits an effect by employing only this reference threshold array (one plane).

It is discovered that the number of low threshold elements by the above-stated periodically ordered dither is preferably about 1/10 of the entire number of elements in sub-matrixes. If this rate is too high, the degree of freedom for the arrangement of thresholds in vacant regions is considerably decreased, with the result that unnatural texture may possibly occur at specific tones. Further, experiments demonstrate that if the range of low thresholds arranged by the periodically ordered dither is about 0 to 20% of the maximum threshold arranged in a unit matrix, good result is obtained.

Next, the size of a unit matrix will be considered. If a unit matrix is too small in size, a periodic or unnecessary texture pattern disadvantageously appears. Considering this, it is necessary that the unit matrix has a size which is appropriate but not redundant. The optimum size varies according to the basic tone characteristics of the respective dots shown in FIG. 10 and to congeniality with a paper sheet to be used. Unless the tone level and optical characteristic have an extremely nonlinear relationship, K and L are set to be integers within the range of the following formula (2) while a unit matrix size is assumed as K×K and the number of output tones after forming multi-level data is N.

$$\frac{2^6}{\sqrt{N-1}} \leq \sqrt{K \times L} \leq \frac{3 \times 2^6}{\sqrt{N-1}} \quad (2)$$

In case of a square matrix (L×L), in particular, L is set to be an integer within the range of the following formula (3), whereby it is possible to suppress the occurrence of periodicity and texture.

$$\frac{2^6}{\sqrt{N-1}} \leq L \leq \frac{3 \times 2^6}{\sqrt{N-1}} \quad (3)$$

The smallest limit size of the unit matrix is determined from a visual tolerance limit and the largest limit size means the largest size which is not redundant. The matrix size thus derived is far smaller than a size of 128×128 which is normally employed in binary stochastic dither and a dither processing can be, therefore, realized in a smaller hardware configuration.

Moreover, as long as the conditions of sub-matrix size and unit matrix size are met, a non-square matrix of, for example, 30×24 shown in the right of FIG. 11A may be used.

Figure 14:
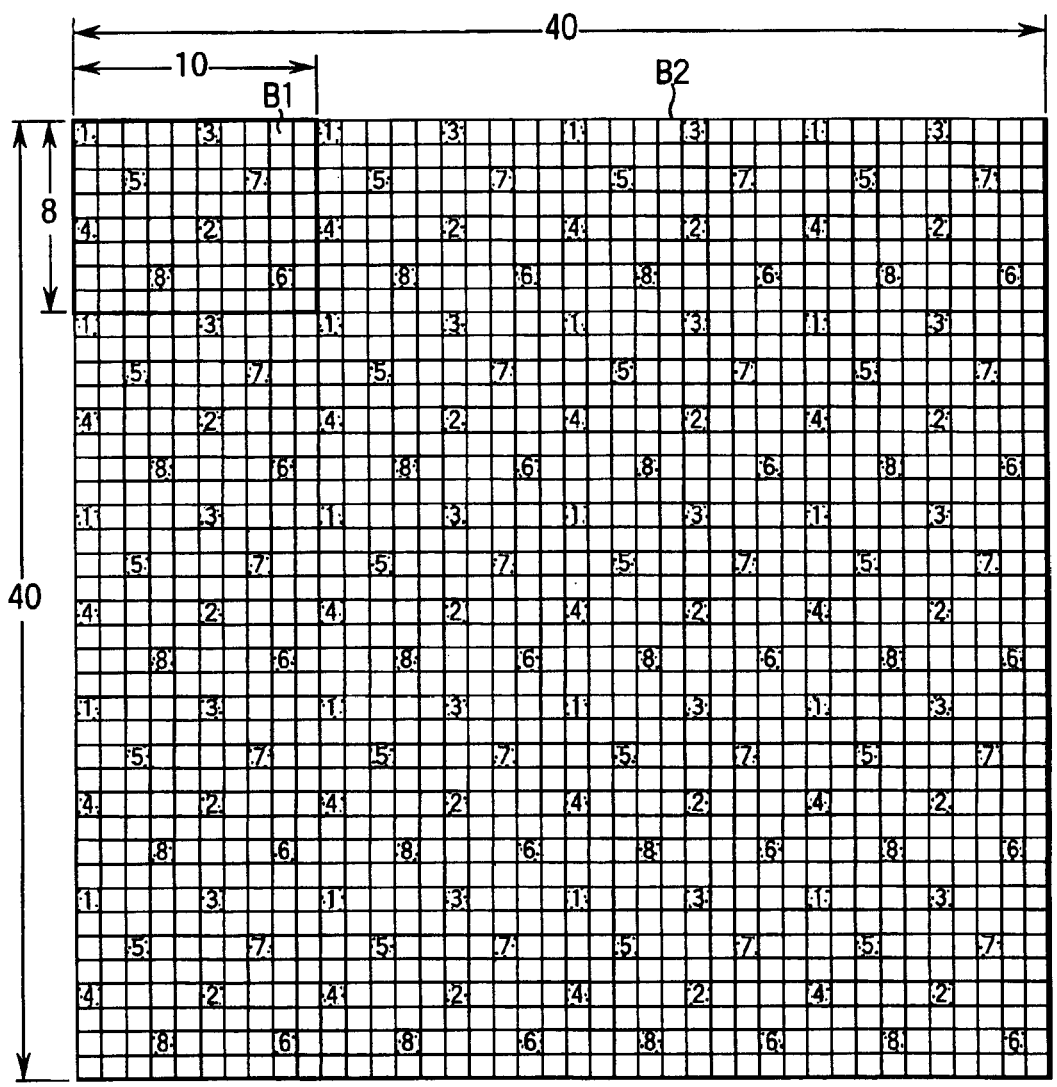
FIG. 14 shows another reference threshold array of the present invention.

In the above example, description has been given while assuming that the sub-matrix is a square matrix. However, it may be a rectangular matrix shown in FIG. 14. Next, the size of a rectangular matrix will be described. FIG. 14 shows a unit matrix for subjecting input tone image data of 8 bits and 256 tones (0: white, 255: black) to a halftone processing to thereby convert the image data into image data of 2 bits and 4 tones (0: white, 3: black).

In this case, the number of planes used is (4−1) or 3. If the largest number of thresholds used on one plane is assumed as "x", the following formula is established.

$$256/\{x*(4-1)+1\} \leq 1, \therefore x \geq 85.$$

In other words, the number of tones for which the three planes are responsible are 85, respectively. However, the number of tones is not necessarily limited to 85. To simplify description, each threshold plane assumes thresholds corresponding to 80 tones. For reference, the entire threshold planes at this moment can reproduce tones of 80*3+1 (white)=241.

If the smallest unit matrix constitute 80 tones, the size of the threshold matrix becomes 10×8. By conducting a dither processing employing this 10×8 threshold matrix, a pattern of 80 tones is reproduced. Here, if it is assumed that a threshold array B1 of 10×8 is a sub-matrix, a unit matrix B2 of 40×40 is large enough to contain four sub-matrixes B1 in main scan direction and five in sub-scan directions, or contain 20 sub-matrixes B1 in all.

If the size of the unit matrix is set to be an integer multiple of that of a sub-matrix, ordered dither processings are conveniently, smoothly repeated. In FIG. 14, a sub-matrix consists of 10 pixels in main scan direction and 8 pixels in sub-scan direction. It is also possible to change the number of pixels between main and sub-scan directions.

Further, as long as the size of the unit matrix satisfies the conditions of the following formula (4), the unit matrix may be a non-square matrix of, for example, 40×48.

$$\frac{2^6}{\sqrt{N-1}} \leq \sqrt{K \times L} \leq \frac{3 \times 2^6}{\sqrt{N-1}} \quad (4)$$

Figure 15:
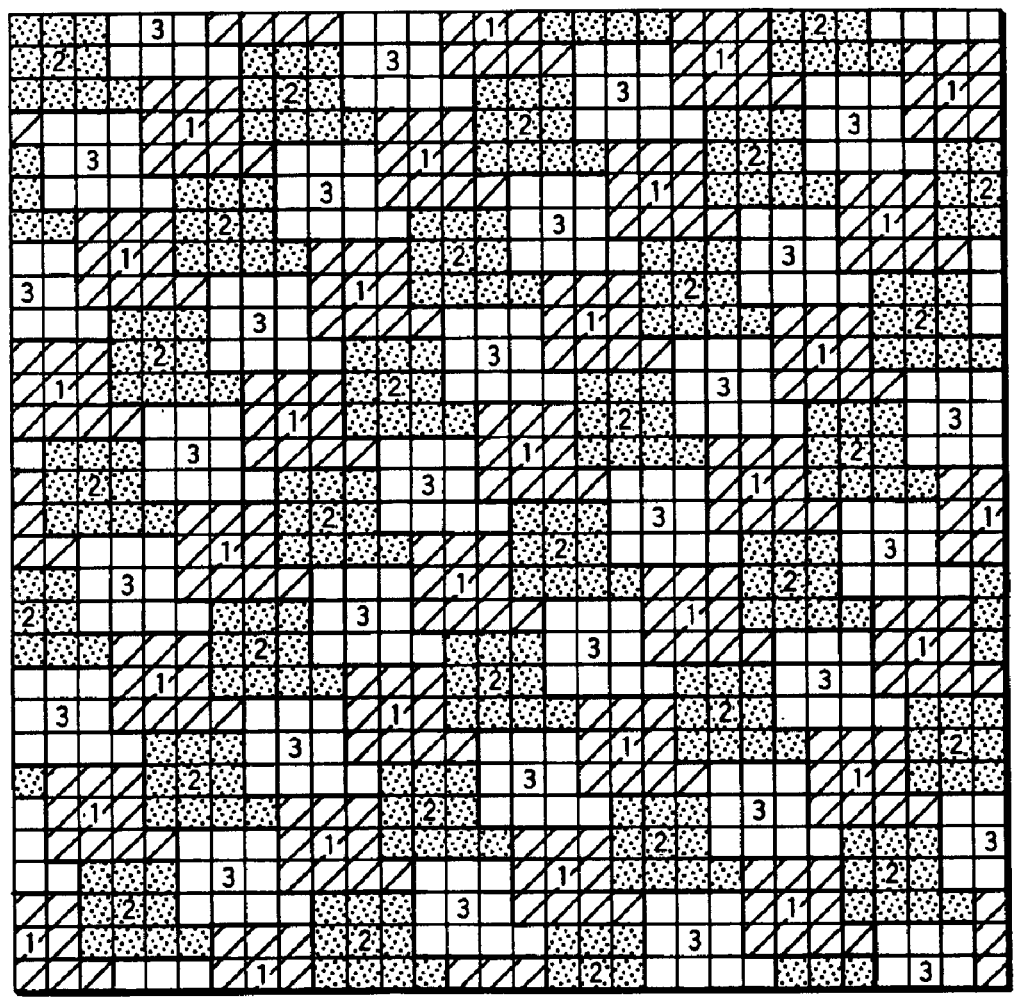
FIG. 15 shows another reference threshold array of the present invention.

Each of the low thresholds arrays in sub-matrixes shown in FIGS. 11 and 14 is an example of forcedly including oblique components. With the above-stated method, however, thresholds in all matrixes can be generated only by using the pattern of the low tone part for a screen dither matrix having an appropriate number of tones, an appropriate angle and an appropriate matrix size as shown in, for example, FIG. 15. Needless to say, the conditions of the formulas (2) and (3) and those for the respective matrix sizes are satisfied in this case, as well.

Further, the number of entire tones to be reproduced is not necessarily limited to 256. Since an intrinsic number of reproduced tones is determined even if screen dither is employed, it suffices that an appropriate number of visually satisfactory tones are be reproduced. In this example, too, the low threshold array is calculated according to the principle of the periodically ordered dither.

Next, another preferred embodiment will be described. In this embodiment, the reference threshold array in a dither matrix is set so that the low tone part is aperiodic over continuous sub-matrixes and that dots in random sizes are output. From the middle tone to high tone parts, the reference dither threshold array is set so as to have an anisotropic output pattern in which dots are continuous in scan direction in which printing accuracy is relatively low.

This embodiment is applied to a printer which is capable of obtaining a visually, characteristically beautiful image if dots are reproduced to be dispersed aperiodically rather than dots are reproduced. periodically, as shown in FIG. 11A, in the low tone part of a printed image. In this embodiment, as in the case of the above, the range of the low thresholds is about 0 to 20% of the maximum threshold arranged in the unit matrix. That is, this embodiment is applied to a printer in which unevenness of density and stripes tend to be always conspicuous from the middle tone to high tone parts irrespectively of printing accuracy but unevenness of density and stripes due to printing error tend to be relatively inconspicuous in the low tone part.

The setting of thresholds may be changed even in the low tone part in which unevenness of density and strips due to printing error are actually relatively inconspicuous in accordance with an image printed by a printer as follows.

Namely, the low threshold array of the printer in which irregularity of printing and stripes are less conspicuous in the low tone part may be designed to have an output pattern completely isotropic as shown in FIG. 13A, in which the same number of dots are stochastically, statistically output in all rows and columns in the main scan direction and subscan direction of the matrix instead of the pattern shown in FIG. 11A and this output pattern may be used as an initial pattern.

Using this initial pattern, thresholds in higher tone parts are formed at random or such thresholds are provided as to provide an anisotropic output pattern in which dots are continuous in scan direction in which printing accuracy is relatively low, by using a convolution filter. Similarly, dot coupling strength from the middle tone to high tone parts is preferably set to be optimum according to printing accuracy.

In this embodiment, the order of thresholds in the threshold array in the low tone part is not initially determined unlike the ordered dither pattern. Accordingly, a low threshold array is obtained in advance so that the same number of dots are stochastically, statistically output in all rows and columns of the matrix at the respective low tone levels. Further, the threshold array in the low tone part may be calculated by applying means for calculating thresholds in the high tone part (such as a convolution filter processing). In addition, since the matrix size is relatively small and the number of tones in the low tone part is small enough, an optimum array may be determined manually.

Moreover, in case of a printer in which unevenness of density and stripes are relatively conspicuous even in a low tone part, a reference dither threshold array is set so as to have an anisotropic output pattern in which dots are continuous in scan direction, in which printing accuracy is relatively low, even in the low tone part. A threshold array in this case may be determined so as to have a completely anisotropic pattern, unlike the pattern shown in FIG. 11A, in which dots are forced to be output continuously in the main scan direction of the matrix and this pattern may be used as an initial pattern. Further, this low threshold array may use an output pattern processed by the error diffusion method in which the coefficients of an error diffusion matrix are optimized, as an initial pattern so that arbitrary uniform tone dots are continuous in main scan direction. Alternatively, an ordered dither threshold array having thresholds characteristically coupled in main scan direction in the low tone part may be used as an initial pattern. Using this initial pattern, thresholds in higher tone parts may be obtained by the same manner stated above.

As a result, it is possible to obtain a reference threshold array for providing optimum output in the entire tone regions to the printer in which it is visually preferable to output dots aperiodically to realize dots periodically as shown in FIG. 11A. Further, it is possible to obtain reference dither thresholds which form an anisotropic output pattern in the middle and high tone parts so as to make irregular printing and stripes inconspicuous.

As already described above, various types of reference threshold arrays thus generated do not have a large correction effect with respect to printing error if used solely in a multi-level printer. However, by combining the arrays with sequences among threshold planes, they can advantageously, greatly reduce unevenness of density and stripes derived from printing error.

While the reference threshold arrays have been described above, a method of developing a reference threshold array in the respective threshold plane directions will be described hereinafter.

As stated above, the basic tone characteristics, as shown in FIG. 10, of the printer for reproducing tones by area modulation varies greatly with multi-level dither processing sequences.

Speaking of compensation for irregularity of printing and stripes derived from printing error, the above two threshold array factors, i.e., the reference threshold array and sequences among the threshold planes, can contribute more to the improvement of image quality by changing sequences among a plurality of multi-level threshold planes.

Unlike a printer in which threshold sequences are restricted by the architecture of an apparatus, the printer according to the present invention can change sequences among the threshold planes relatively easily. Changing sequences among the threshold planes can advantageously suppress occurrence of irregularity of printing, stripes and the like derived from printing error but, at the same time, largely influence the resolution and tone reproduction characteristics. It is, therefore, required to make such changes deliberately.

This embodiment is designed to realize two optimizations in respect of threshold sequences. The first optimization will be described with reference to FIG. 10. As already stated above, FIG. 10 shows the ordinary basic tone characteristics of an output apparatus for reproducing pixels by area modulation and shows that the tone resolution of a low tone part is lower than those of the middle and high tone parts. If so, in the low tone part, tones can be reproduced more accurately by printing an image while appropriately mixing dots of tone level 1 with those of other tone levels according to the tone levels of input pixels rather than printing an image while using dots of the same size and tone level 1.

Figure 16A:
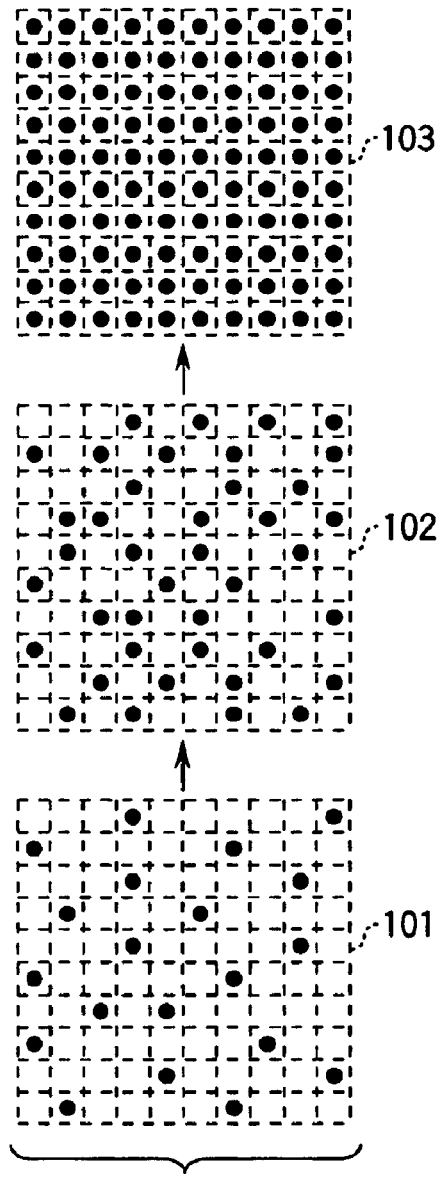
FIGS. 16A and 16B show examples of pixel growth using the threshold sequence of the present invention.
Figure 16B:
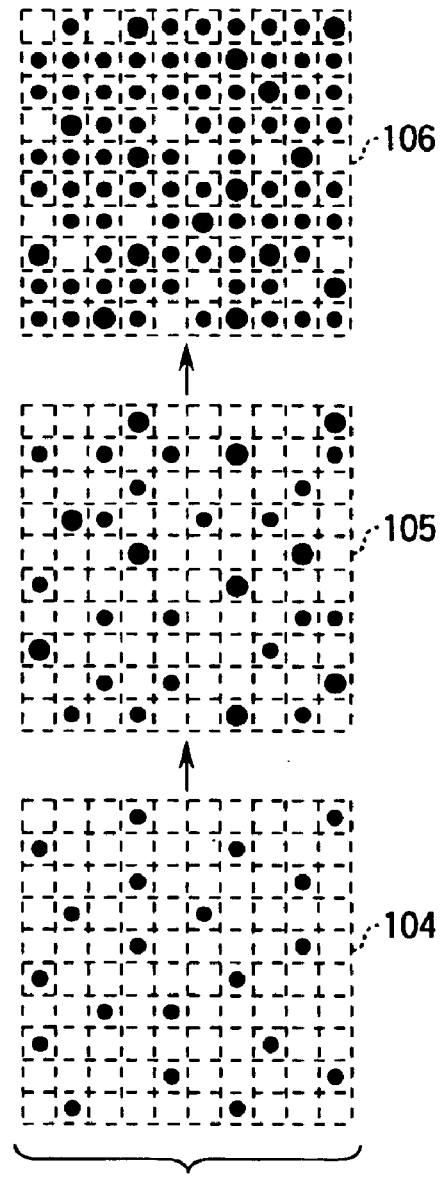

This state is shown in FIGS. 16A and 16B. FIG. 16A shows the growing process of dots if an image is processed by means of a threshold plane sequence which can realize the highest resolution as shown in FIG. 7A. In FIG. 16A, reference symbol 101 denotes the result of processing an input image of, for example, uniform tone level 2 in the threshold range of FIG. 7A using the threshold plane of FIG. 7A, references symbol 102 shows the result of processing an input image of, for example, uniform tone level 4 in the threshold range of FIG. 7A using the threshold plane of FIG. 7A and reference symbol 103 denotes the result of processing an input image of, for example, uniform tone level 9 in the threshold range of FIG. 7A using the threshold plane of FIG. 7A.

On the other hand, as shown in FIG. 16B, it is theoretically possible to obtain output of the same density as that in FIG. 16A by outputting dots of difference sizes. Reference symbols 104 to 106 denote the results of processing an input image of the same tone levels as those of reference symbols 101 to 103 of FIG. 16A, respectively.

Judging from the output characteristics shown in FIG. 10, more smooth density change can be obtained between neighboring tones in the growing process of FIG. 16B. It is noted, however, that the processing using the threshold plane sequence is applied to a printer in which various sizes of uncomfortable patterns are visually inconspicuous since dots larger than those of tone level 1 are output to the low tone part.

Next, a preferred method for obtaining an optimum dot output pattern will be specifically described. As shown in FIG. 17A, if an input image has low tones, dots larger than those of tone level 1 by several tones are first grown before dots of tone level 1 are output instead of using an output pattern for outputting only dots of tone level 1. If the size of the dots is such that the dots cannot be visually recognized as large dots, while tones of the low tone input image are smoothly changed, a resultant output pattern has far smoother tone level change than that of the output pattern shown in FIG. 17A.

A threshold sequence for realizing this output pattern of FIG. 17A is shown in FIG. 18. In this example, low thresholds (corresponding to reference thresholds 1 to 4) on the threshold planes 1 to 3 form a periodically ordered dither array. Therefore, dots of up to tone level 3 are preferentially output to positions corresponding to these thresholds. This processing is effective in that it can advantageously make an output pattern per se visually preferred but also it can advantageously obtain an output pattern resisting printing error and the like because neighboring dots are away from one another. The thresholds exhibiting such advantages fall in a range corresponding to tone levels of about 0 to 10% of the highest tone level of an input image.

The above description concerns a case of preferentially outputting dots of up to tone level 3 to a periodic output pattern. Actually, however, the setting of this sequence largely relies on the tone characteristics shown in FIG. 10, i.e., dot diameters corresponding to tone levels. That is, dot size largely depend on the resolution of the printer. For example, in case of the resolution of 300 dpi and 600 dpi, the size and pitch of the smallest dot differ even if the output tone level is the same. Also, as the resolution of the printer is higher, the diameters of dots actually measured are greatly shifted from ideal dot diameters in design, with the result that basic tone characteristics tends to be nonlinear.

Figures 19A, 19B:
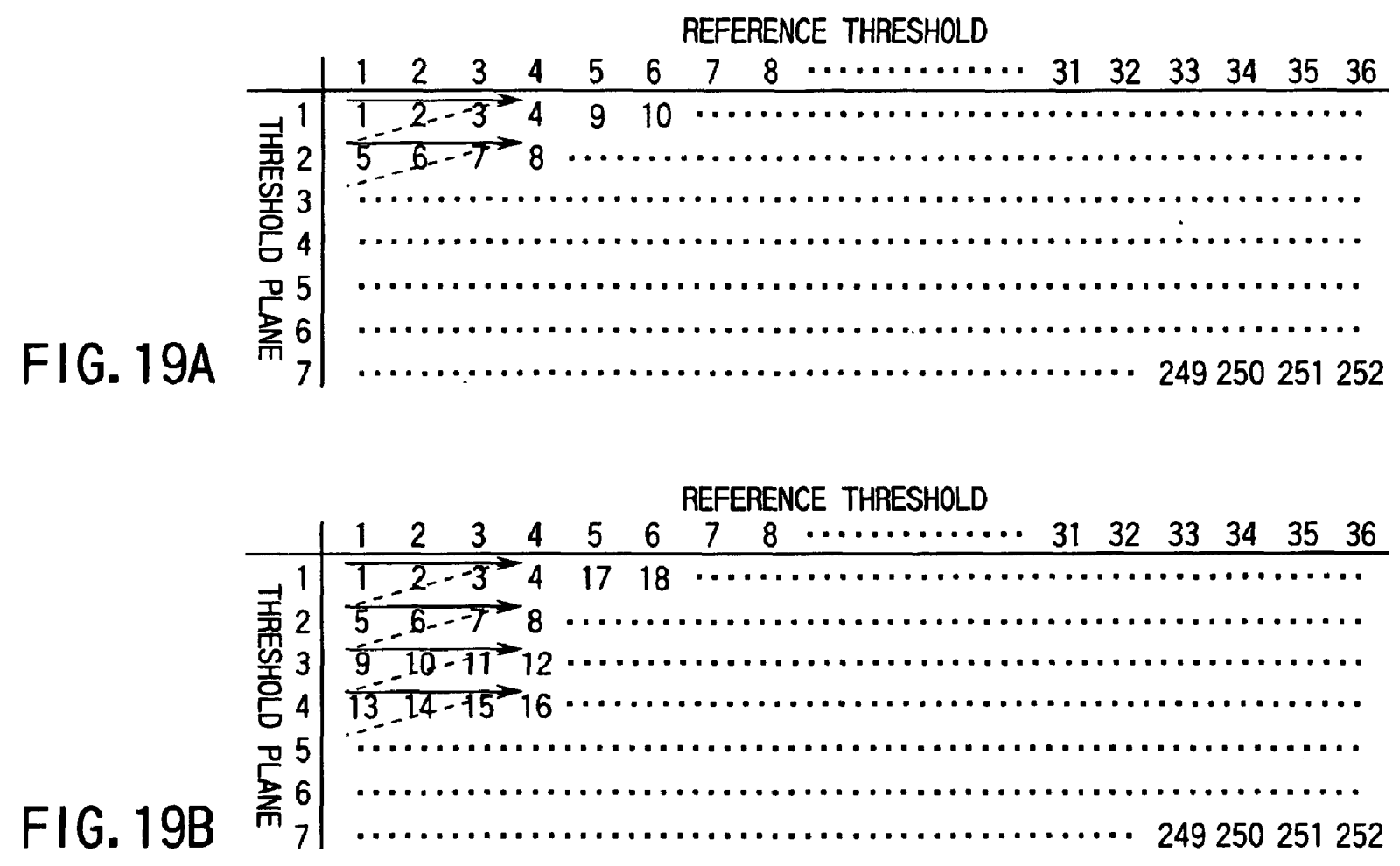

Based on the above, therefore, the design of the sequence is optimized as shown in FIGS. 19A and 19B according to the above principle and according to the tone characteristics (particularly dot diameters at the respective tone levels) which vary with printers due to the above-stated factors. Further, the setting of the sequence can be optimized as shown in FIGS. 19A and 19B by printing accuracy according to the above principle. In FIG. 19A, dots of up to tone level 2 are preferentially output. In FIG. 19B, dots of up to tone level 4 are preferentially output.

Figure 20:
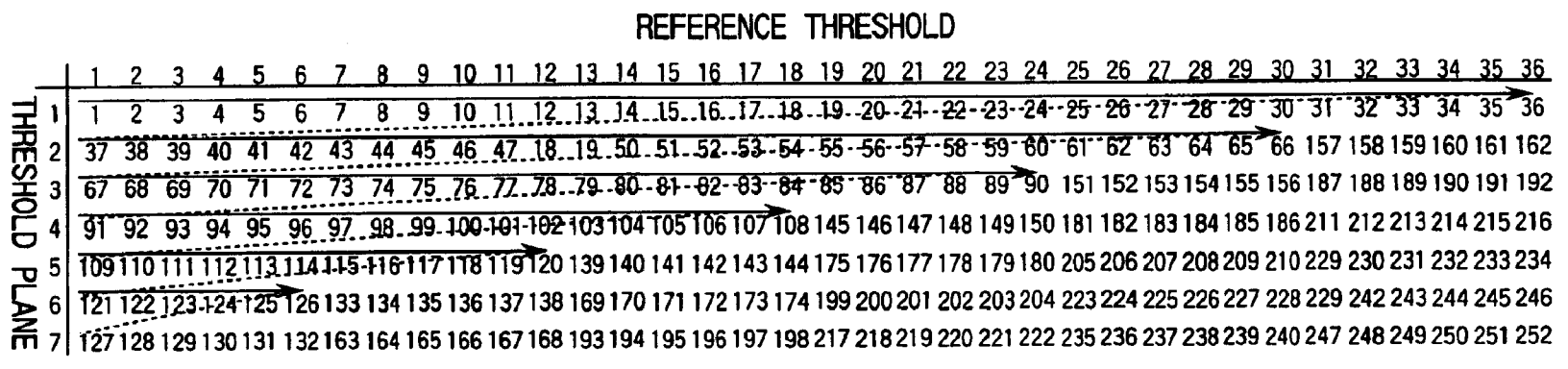

Another preferred embodiment concerning sequences will be described. This embodiment is applied to a printer having very small dots of tone level 1 and having good tone characteristics. In case of such a printer, since an output image has smaller dots than output pixel intervals, with input pixels having tone levels of 0 to 20% of the input highest tone level, unevenness of density and stripes are less conspicuous. Utilizing this, a dither threshold array is determined so that the spatial frequency of an output image is increased, as shown in, for example, FIG. 17A, with respect to an input image having tone levels in that range. FIG. 20 shows one example of the determination.

If a threshold plane sequence shown in FIG. 20 is used and input image data is in a low tone part, the types of diameters of output dots are substantially a few. As the input image data is closer to the middle to high tone parts, the types of diameters of output dots increase.

Thus, the dots in the low tone part which are very important factors for the reproduction of tones in the printer can be made inconspicuous and the types of diameters of dots are increased in the middle to high tone parts in which unevenness of density and stripes tend to be conspicuous, to thereby make unevenness of density and stripes inconspicuous. Further, unlike a case where thresholds are arranged at random, thresholds on the respective planes can be automatically obtained from a reference threshold array because of the correlation among the respective threshold planes, so that simpler hardware configuration can be expected.

Moreover, the setting of the sequence can be optimized as shown in FIGS. 21A and 21B according to the above principle and according to the basic tone characteristics. The threshold sequence can be more effective if combining the sequence with the optimization of the reference threshold array already described above.

Figure 22A:
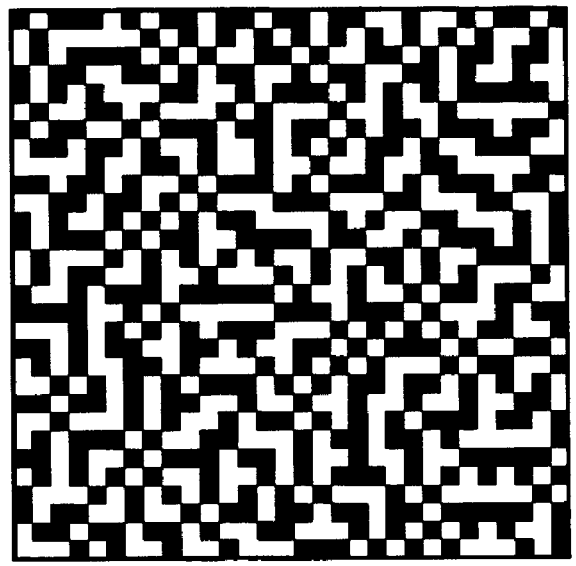
FIGS. 22A and 22B show dots outputted using an isotropic threshold sequence and an anisotropic threshold sequence of the present invention, respectively.
Figure 22B:
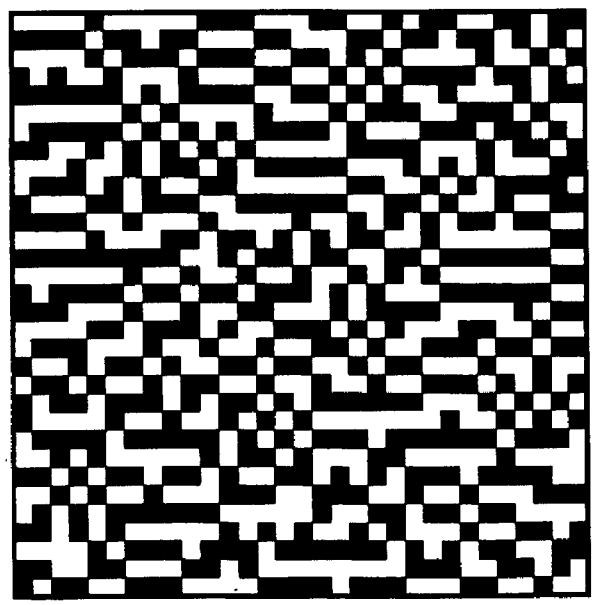

FIG. 22A shows a state n which an image in a middle tone part is output using a normal, aperiodic, uniformly dispersed reference threshold array. FIG. 22B shows a state in which an image in the middle tone part is output using an anisotropic reference threshold array in which dots are continuous in scan direction in which printing accuracy is relatively low.

FIGS. 23A to 23C show states of output patterns actually printed on a paper sheet using threshold sequences shown in FIGS. 7A to 7C, respectively. Pixels corresponding to portions indicated by dashed line C—C of FIGS. 23A to 23D are shifted right due to the influence of, for example, erroneous direction of ink heads and the like. FIG. 23C shows an output pattern printed by using isotropic threshold sequences in view of reference threshold array.

Meanwhile, FIG. 23D shows a state of an output pattern in this embodiment. In FIG. 23D, the reference threshold array corresponds to the anisotropic array of FIG. 22B. In case of FIG. 23D, the reference threshold arrays are coupled preferentially in transverse direction. That is, thresholds between adjacent pixels in transverse direction have relatively close values and dots tend to grow transversely.

Thus, a printing error correction effect can be expected to some extent in case of FIG. 23C; however, the output pattern of FIG. 23D can be expected to have a greater correction effect. By configuring the reference threshold array and sequences among the threshold planes so as to obtain an output pattern as shown in FIG. 23D, it is possible to make unevenness of density and stripes less conspicuous even if print position accuracy is low.

Next, description will be given to an embodiment for incorporating gamma correction into a multi-level dither threshold array.

Normally, the theoretical number of tones which a halftone processing can reproduce is determined by the total number of different thresholds in a unit matrix. According to the screen dither method, the intrinsic number of tones determined by a combination of pattern size, screen angle and the like can be reproduced. According to the stochastic dither method and the error diffusion method, 256 tones as many as input tones can be reproduced.

However, this theoretic number of tones indicates the tone reproducibility of the halftone processing section itself. In actuality, there is a possibility that the loss of tone data occurs to the entire portions of the image processing section provided in front of the halftone processing section. Therefore, the image data finally input to the halftone processing section has decreased number of tones, with the result that there exist output tones which are not at all employed in the halftone processing section.

The ordinary image processing is carried out in the order of color conversion→BG/UCR→gamma correction→halftone processing, during which process the loss of tones due to rounding error as a result of digital operation processing, color range compression or the like, occurs.

While tone loss in the color conversion section and the UCR section is basically not restorable, the reproduction of tones in the gamma correction section and the halftone processing section will be described hereinafter.

Figure 24:
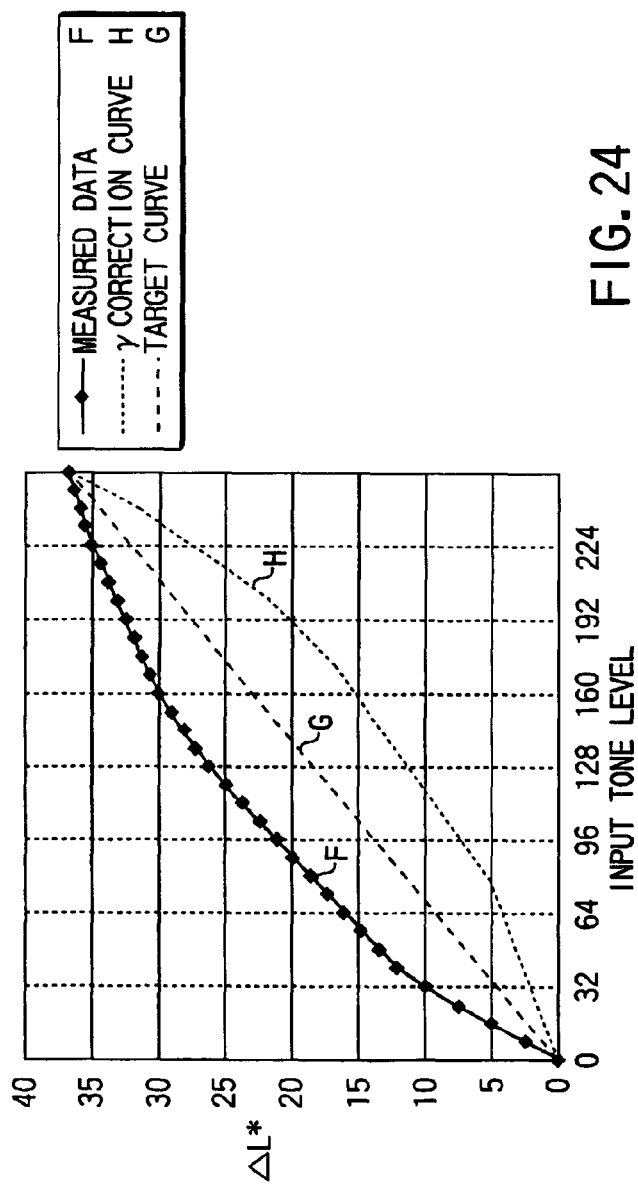
FIG. 24 is an explanatory view for gamma characteristics and gamma correction.

The gamma correction is a processing to correct the tone characteristics of the printer engine to target characteristics linear to either brightness or density. FIG. 24 is an explanatory view for the gamma correction. In FIG. 24, the horizontal axis represent input tone level and the vertical axis represents brightness $\Delta L^*$. A curve F indicates the measured basic tone characteristics of the printer engine. The brightness $\Delta L^*$ indicates the difference between the brightness of measurement target input tone level and that of input tone level 0. Therefore, the higher value of the brightness $\Delta L^*$ means that the image is darker.

Using the tone characteristics F, a gamma correction curve H symmetric to the target characteristics G is obtained. Using, in turn, the gamma correction curve H, the input image data is converted, whereby the tone characteristics is corrected to target characteristics. For example, the input tone level "64" is corrected to a tone level "32" and the input tone level "32" is corrected to a tone level "20" by this gamma correction. Although the target curve is straight in FIG. 24, it may be replaced by an arbitrary curve.

As shown in FIG. 24, the basic tone characteristics F of the output apparatus for expressing dots in the form of a circle and conducting area modulation appears as a curve above the target characteristics G. Actual gamma γ correction is, in many cases, carried out by digital 1 (one-dimension) LUT operation for the respective colors.

Figure 25:
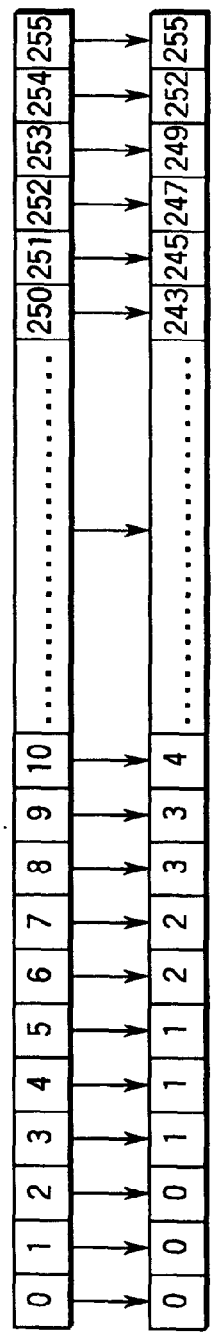
FIG. 25 shows gamma conversion by ordinary table conversion.

In FIG. 24, the digital 1 LUT operation conducts conversion operation which is specifically shown in FIG. 25. In the low tone part, a plurality of different values (e.g., 0, 1 and 2) are converted into an equal value (0) due to digital rounding error. In the high tone part, continuous values (e.g., 250 and 251) are converted into sporadic values (243 and 245).

That is to say, in the low tone part which is important for tone reproduction, even if input tone levels are different, output dots tend to have the same pattern and dot patterns which are not used (e.g., 244) in the high tone part exist. As a result, the number of reproduced tones decreases and image processing conversion accuracy is lowered. According to this phenomenon, if the basic tone characteristics of the printer engine is farther from the target characteristics, digital conversion efficiency becomes lower and the number of reproduced tones greatly decreases. Speaking of an ink jet printer, however, its characteristics is relatively close to ideal one.

Based on the above, therefore, in this embodiment, gamma correction is incorporated in the halftone processing and a matrix for theoretically suppressing tone loss is created. As for the binary dither processing, a dither threshold generation method including therein gamma correction is well-known. In case of a multi-level dither processing, however, tone characteristics among the planes are not linear. Due to this, although the conventional method is applicable to sequences among limited threshold planes, it is normally difficult to apply the method thereto.

For example, if one pixel has 8 levels, matrix size is 32×32 and the number of output tones is 8 (7 threshold planes), then the number of dots on which ON/OFF states of output pixels are changed, i.e., the number of the same thresholds on 7 threshold planes is 32×32×(8−1)/255≈28 as the tone level of an input image (image of uniform tone level) is incremented by "one". "OFF output pixel" indicates a state in which input tone data is not more than a threshold in a threshold plane. "ON output pixel" indicates a state in which input tone data is greater than arbitrary dither threshold plane. The number of ONs indicates the number of order of the threshold plane which the input data exceeds, it is 7 at most. In normal halftone processing, the same thresholds are uniformly allotted to the tones. For example, if the number of the same thresholds is 28, then the number of same thresholds allotted per plane is 28.

The basic principle of this embodiment is that gamma conversion characteristics are incorporated into thresholds on all threshold planes determining whether output pixels are turned ON or OFF in the halftone processing. Specifically, among the thresholds arranged on a plurality of threshold planes, the number of same thresholds for turning output pixels ON is determined according to the gamma characteristics every time the tone level of the input image of same tone level is incremented by "1". That is, the gamma correction section of the digital conversion which may cause tone loss is not employed but a gamma processing is employed only for adjusting the number of ON output pixels to the respective input tone levels. As a result, the input tone level is truly restored.

Figures 26A, 26B:
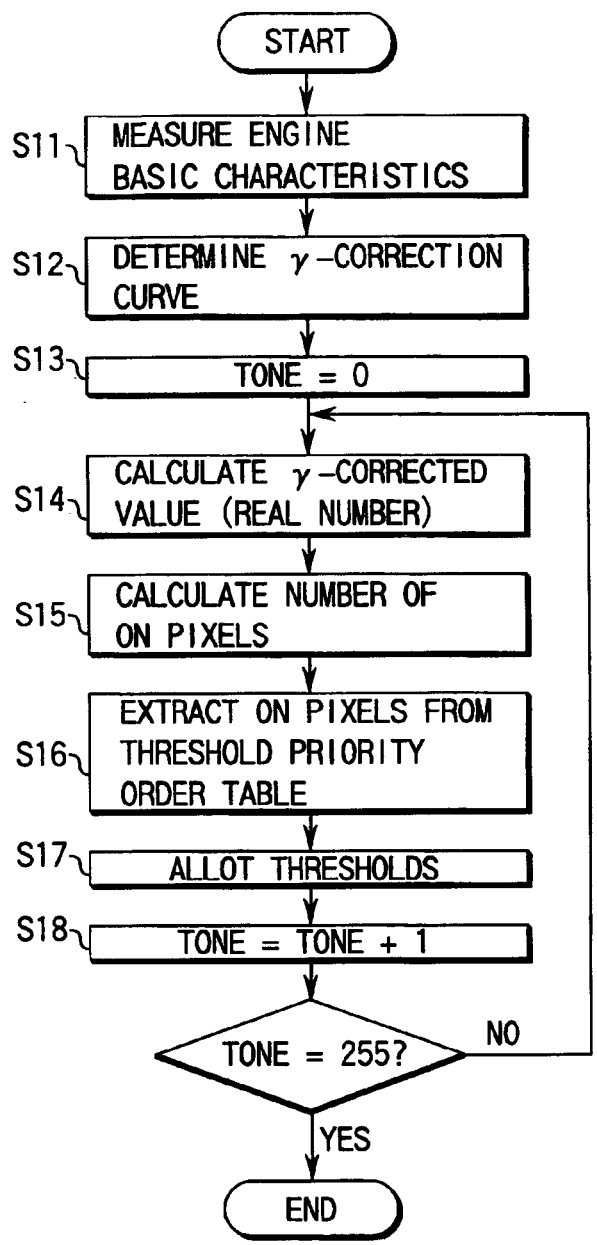
FIGS. 26A and 26B are a flow chart and a table for determining dither thresholds among entire threshold planes into which gamma correction is incorporated according to the present invention.

A method of calculating a multi-level dither threshold array into which this gamma correction is incorporated will be described with reference to FIGS. 26A, 28B and 24. FIG. 26A is a flow chart showing this calculation method. First, in a step S11, using a multi-level dither matrix in which the number of thresholds is uniformly allotted to respective planes, the basic tone characteristics (see curve F of FIG. 24) of the printer engine is measured. Next, in a step S12, a gamma correction curve H is determined from a target curve G. In a step S13, the tone is set at 0.

Next, in a step S14, as in the case of normal gamma conversion, a gamma-corrected tone level is calculated from each of the input tone levels using the gamma correction curve H. At this moment, the gamma-corrected tone level is calculated not as an integer but as an actual number (including values down to a decimal point). As shown in FIG. 26B, for example, a gamma-corrected tone level is calculated as "0.6" from input tone level "1" or as "1.5" from input tone level "3".

Thereafter, in a step S15, from the gamma-corrected tone level thus calculated, the number of ON pixels (ON number) which increases every time the input tone level is incremented by one is calculated as shown in FIG. 26B. In case of a multi-level dither processing while the input tone level is "256" and 7 planes of 32×32 matrixes are employed, the value of ON number is normally 28. Accordingly, as the input tone level is incremented by one, 28 output pixels are turned ON among thresholds of 32×32×7 on the 7 planes.

According to the present invention, however, the number of ON pixels is determined according to the gamma-corrected tone level calculated in the step S14 as shown in FIG. 26B. To simplify description, FIG. 26B shows a case where the normally, uniformly allotted number (28 in the above example) is "4". For example, if the gamma-corrected tone level is "0.6" while the input tone level is "1" in the step S14, the number of ON pixels (ON number) is 4×0.6=2.4≈2. If the gamma-corrected tone level is "1" while the input tone level is "1", the number of ON pixels is 4×1=4.

Next, in a step S16, ON pixels are extracted from a threshold priority order table. This threshold priority order table shows, as will be described in detail later, orders of priority given to all thresholds included in, for example, 7 threshold planes of 32×32 matrix. Which priority order is given to which threshold on which plane is determined according to the threshold sequence algorithm which has been described in the preceding embodiment of the present invention.

In a step S17, in accordance with the number of dots to be turned ON obtained in the step S15, multi-level dither thresholds are allotted to the threshold sections on all threshold planes in the order of low to high priority orders. In the above case, for example, since the number of ON pixels is 16 with the input tone level of "1", the matrix threshold of the priority orders 1 to 16 is determined as "1". In a step S18, the tone is incremented by one. Then, the processings from steps S14 to S18 are repeatedly carried out throughout the tones, whereby all thresholds can be filled in all threshold planes.

FIGS. 27A to 27C show a threshold allotting method in this embodiment. In FIGS. 27A to 27C, to simplify description, it is assumed that reference thresholds are up to 4 and the number of threshold planes is 3. Reference symbol 107 denotes a sequence of thresholds extending over a plurality of threshold planes. Reference symbol 108 denotes orders of priority of thresholds arranged on each threshold plane. The priority orders can be determined by, for example, conducting the above-stated convolution filtering operation. Reference symbol 109 denotes a conventional reference threshold array obtained by uniformly allotting the reference thresholds 1 to 4, i.e., four reference thresholds 1 to 4. FIG. 27B shows that orders of priority are allotted to all thresholds on the three planes based on the priority orders shown in FIG. 27A.

As shown in, for example, reference 107 of FIG. 27A, threshold 1 is a reference threshold 1 on the first threshold plane. In case of FIG. 26B, therefore, orders of priority of four portions in reference symbol 110 of FIG. 27B indicated by "1" of reference symbol 109 in FIG. 27A are determined as 1, 2, 3 and 4 according to orders "1, 2, 3 and 4" shown in reference symbol 108. Next, threshold 2 corresponds to a reference threshold 1 on the second plane as shown in reference symbol 107 of FIG. 27A. Accordingly, as in the case of the above, orders of priority of four portions on the second plane are determined as 5, 6, 7 and 8 as shown in reference symbol 111 in FIG. 27B. In this way, orders of priority of all thresholds on the entire planes are determined.

According to orders of priority of all thresholds, the thresholds are determined by the ON number of input tone levels calculated as shown in FIG. 26B. For example, as shown in reference symbol 113 of FIG. 27C, two thresholds 1 on the first plane are determined first. Then, two thresholds 2 on the first plane are determined as shown in reference symbols 113 of FIG. 27C. In this way, no matter how complicated the sequences among the threshold planes may be, all thresholds on all threshold planes are determined on uniqueness basis.

It is noted that if a periodic pattern is output in the low tone part, the orders of priority are determined according to rule of the ordered dither processing. For example, orders of priority are determined for all blank portions but the low threshold part shown in FIG. 11A, and middle and high thresholds are determined according to the priority orders.

In the above-stated embodiment, the reference threshold array and the sequences among the threshold planes are appropriately combined, whereby it is possible to incorporate gamma correction into the multi-level dither thresholds and to, therefore, obtain an image of higher tone reproducibility. The above embodiment basically concerns a threshold sequence for a single color such as black. It is easy to expand this method to a color image. In that case, however, it is required to consider how output dots of the respective colors are superposed on others.

In case of a color image, a multi-level dither processing is normally carried out for each color. Now, consideration will be given to a case where a dither processing is conducted to at least two colors while employing threshold planes having the threshold arrays described in the above embodiment.

Some colors are not required to use the reference threshold array in the embodiment. For example, as for Yellow which is a color which dot grains are quite inconspicuous visually, the reference threshold array in the above-stated embodiment is not employed but a simple, conventional dither threshold array may be employed. As for Black which is a color the edge of which is desired to be more emphasized, a multi-level error diffusion processing is employed so as to enhance an edge effect.

On the other hand, if exactly the same threshold pattern is applied to all colors to which the above-stated processing is conducted, the pattern is a Dot-On-Dot output pattern, i.e., a pattern on which dots are superposed is provided. Accordingly, if dot print positions are slipped due to the variation of printer output characteristics and the like, unevenness of colors may disadvantageously occur. It is, therefore, necessary to use different reference threshold arrays for the respective colors. To realize this, reference threshold arrays may be created for the respective colors individually; however, it is easier to create them by operations such as the inversion, rotation or shift of the reference threshold array created once.

Normally, a printer which outputs two levels per color is required to be designed more strictly in view of color moiré depending on the correlation of dots of respective colors. In case of a multi-level printer, by contrast, color moiré due to the combination of patterns of the respective colors occurs less frequently, so that a highly accurate image can be expected to be obtained by the relatively simple operation of changing thresholds. Further, in case of the multi-level output printer which inherently has threshold arrays of high dot dispersibility for the respective tones, a simple threshold operation will suffice. If an image is to be reproduced while employing periodically ordered dither for a low tone part thereof, output patterns having quite high periodicity are provided for the corresponding tone part. For that reason, it is required to appropriately design thresholds in view of color interference.

As one preferred example of the simple threshold operation, thresholds may be allotted to sub-matrixes or minimum dither units by conducting operation such as inversion, rotation or shift as shown in FIG. 28 to rearrange the thresholds. In FIG. 28, reference symbol 101 denotes a low threshold array which is designed first. Reference symbol 102 denotes an array obtained by inverting the array of reference symbol 101 horizontally. Reference symbol 103 denotes an array obtained by inverting the array of reference symbol 101 vertically. Reference symbol 104 denotes an array obtained by rotating the array of reference symbol 101 and reference symbol 105 denotes an array obtained by shifting the array of reference symbol 101. Alternatively, as indicated by an array denoted by reference symbol 106, a completely different pattern is created and thresholds on all matrixes are recreated based on this newly created reference threshold pattern for different colors. At this moment, in the low tone patterns of the respective colors, it is preferable that dots are not superposed at the same position but arranged away from one another as far as possible as shown in FIG. 28. This is because a dot superposed portion substantially becomes a secondary color to make the existence of dots more conspicuous visually. Also, this is because superposed dots make periodicity provided with this tone part, more conspicuous.

Meanwhile, as for sequences among threshold planes in respect of colors, it is possible to easily realize the optimum settings of sequences for the respective colors according to the actual printing accuracies for the respective colors. This is because multi-level dither processings are independently conducted for the respective colors.

Further, even if printing accuracy is statistically the same, it is known that the influence of unevenness of density and stripes on visibility normally differs greatly according to colors. For example, with the same printing accuracy, colors in the order of Y→C→M→K are more conspicuous as noise to human eyes. Considering this, sequences among threshold planes are appropriately changed according to colors- and halftoning is conducted in the multi-level dither processings -for the respective colors, thereby making it possible to obtain a more appropriate output image.

While description has been given to four colors of CMYK, the change of sequences is not limited to four colors and it can be easily realized by three colors of CMY or a combination of other colors. Further, while description has been given to the multi-level dither processing, most of the processing may be easily applicable to a binary dither processing except for that limited to multiple levels such as the setting of sequences among threshold planes.

The improvement of color quality, which has been described above, is intended to improve color quality for each color. In case of considering plural colors, a color registration technique for suppressing color unevenness plays an important role, as an image quality improving factor, in stable color reproduction.

Here, considering that K is generally a special color replaced from C, M and Y, three colors of C, M and Y will be taken as an example to give basic description to colors.

Normally, to reproduce colors in a color printer, respective colors are registered or separated on a paper sheet. Even if colors are arranged not to be superposed on the others as shown in FIG. 29A, they are actually printed in a superposed manner due to printing error. FIG. 29B shows an extreme example of this superposed state. This is true for the opposite case. If the superposition of colors differs according to print positions, colors appear differently due to actual ink spectral reflection characteristics and color unevenness occurs.

A composite color as shown in FIG. 29A is normally referred to as parallel additive color mixture and that as shown in FIG. 29B is referred to as subtractive color mixture. FIGS. 29A and 29B show extreme states of superposed colors. In actuality, various manners in which colors of respective dots formed on a printing paper sheet, are superposed are assumed such as the intermediate state of FIGS. 29A and 29B or only one color being slipped. Thus, it is necessary to generally take account of color slippage (slipping of color dots from their respective ideal print positions).

Causes for the slippage of colors in the printer for reproducing tones by area modulation, include the mechanical error of nozzles and the skew of a head. Although it is possible to use expensive parts for these elements or to conduct feedback correction completely mechanically, the limitation of cost exists. Accordingly, there is proposed a method of compensating for color unevenness derived from the slippage of color positions by image processing, which method will be described hereinafter.

In this embodiment, to simplify description, description will be given not to the local unevenness of colors resulting from erroneous color direction or the like as already stated above but to the compensation of slipped color positions smoothly changing throughout the paper sheet.

The limitation of the positional errors caused by respective color slippage factors among the respective color dots formed on the paper is normally 80 to 120 μm. If the error exceeds the limitation, a resultant image becomes visually unfavorable. Compared with an electrophotographic system and an ink jet system, it is generally more difficult for the electrophotographic system to suppress color slippage due to its complex process. The unevenness of colors makes the edge portion of a character/line image and that of a photographic image appear most awkward in terms of visual characteristics. For that reason, normally, stricter conditions for image quality are set for the compensation of color unevenness for character/line images.

Two methods are mainly known as halftone processings effective against unevenness of colors, i.e., a screen processing or mesh-dot processing and a dot dispersion processing.

In the screen processing, blocks referred to as halftone dots are periodically formed out of a plurality of pixels and tones are reproduced based on the magnitude of the halftone dots. As shown in FIG. 30, the arrangement of the halftone dots are changed by changing screen angle for every color. By doing so, even if the position of a specific color is shifted, "area compensation" is effected and the change of the area of a portion in which halftone dots overlap can be reduced small as a whole. The screen angle is an angle of adjacent halftone dots of same color in horizontal direction as indicated by θ1 to θ4 in FIG. 30. The screen angle is fixed for each color. For example, the screen angles of K (black) are θ1=45 degrees and θ2=−45 degrees.

The image quality improving means is essentially the same and it is designed to provide higher resolution and to ensure the number of lines. It is noted that this processing is fundamentally based on a binary output device.

Since the present invention concerns a binary halftone processing, it is possible to designate a threshold array three-dimensionally using a plurality of planes. Therefore, if a reference threshold array is given screen angles and orders of thresholds in the direction of pixel depth are allotted as shown in FIG. 7B, the same advantage as that of the screen processing can be expected to some extent. Nevertheless, since the present invention is based on the growth of an independent pixel from the center of the pixel, there disadvantageously exist tones which cause gaps at intervals without forming one block even if a halftone dot is to be formed. Further, if the above-stated screen processing is carried out in a printer which does not have high resolution, the substantial resolution of the printer lowers to thereby disadvantageously make the blocks of dots very conspicuous.

To avoid these disadvantages, according to the present invention, a dot dispersion processing in a low tone part by using a reference threshold array and the sequence of threshold arrays among threshold planes are originally contrived to thereby suppress unevenness of colors. In other words, in the reference threshold array, thresholds are arranged so that pixels are outputted not as a block but uniformly and dispersedly and color shading is expressed by the density of such pixels. Due to the mutually dispersed arrangement of dots of the respective colors, even if the position of the dots of a specific color is shifted, the variation of the area overlapping rate of the respective colors can be reduced or suppressed based on the randomness statistically.

As can be seen, by dispersedly arranging thresholds in the reference threshold array, it is possible to heighten substantial resolution and enhance edge reproducibility compared with the conventional, well-known screen processing. Moreover, according to the present invention, normal moiré and roseate moiré hardly occur. For that reason, this embodiment has an advantage of being suite for a low resolution printer. Besides, unevenness of colors can be suppressed by the combination of the uniformly dispersed reference threshold array and a threshold array sequence among the threshold planes to be described hereinafter.

Next, the threshold array sequence among the threshold planes will be described.

Here, it is important to study potential influence of each color on human eyes. This is because colors differ in influence as noise on human eyes. Taking this into consideration, it is essential to understand how to recognize the characteristics of a single color as well as those of secondary and tertiary colors with a view to suppressing unevenness of colors without substantially lowering the resolution of the printer and deteriorating graininess.

First, a single color will be considered. From a viewpoint of unevenness of colors (uneven hues), the reproduction of a single color does not bring about any problem. However, by taking note of the characteristics of a single color, it is possible to obtain effective means for suppressing unevenness of color which take place when colors are superposed as secondary and tertiary colors. The secondary color means a color generated by a mixture of two colors and the tertiary color means a color generated by a mixture of three colors.

It is normally said that the influence of colors, as noise, directed to vision grows in the order of Y→C→M→K. Accordingly, if a threshold array sequence among threshold planes as shown in FIG. 7B is applied K, dot blocks are made easily recognizable and graininess deteriorate to the worst level. Meanwhile, if the same sequence is applied to Y, dot block are least recognizable and the deterioration of image quality is little. C and M exhibit intermediate characteristics between K and Y.

Upon consideration of the characteristics of a single color, description will be given to a method of suppressing unevenness of colors for secondary and tertiary colors.

In case of full color of 24 bits per pixel, enormous color combinations may be present including 224=about 16 million colors. In case of a low resolution device, like the printer of the present invention, an output image is reproduced as 3 bits per pixel and about 8 tones for each color, the number of physical combinations of dot sizes amounts to 83=512. In the multi-level dither processing, however, a combination of colors close to full color is artificially realized for every certain area range (unit matrix).

It is noted that these unevenness of colors due to the displacement of color dots is not recognized with the same visual sensitivity in such color combinations. Depending on reproduced combination of colors, unevenness of colors is conspicuous in some combination and not at all conspicuous in others even with the same quantity of physical color slippage.

Generally, as a measure of representing variations of unevenness of colors caused by color slippage or the like, a color variation quantity ΔE is used. The color variation quantity ΔE is expressed by the following formula (5). In the formula, symbol ΔL* is lightness difference and Δa* and Δb* are hues. The larger ΔE indicates larger color variation quantity.

$$\Delta E = \sqrt{\Delta L^{*2} + \Delta a^{*2} + \Delta b^{*2}} \qquad (5)$$

Now, description will be continued using this color variation quantity.

First, color variation quantity for secondary color will be considered. If colors are reproduced by area modulation, a dot-on-dot pattern in which dots completely overlap and a patter in which a certain color dot is shifted by a half-pixel of a resolution pitch from another color dot as shown in FIGS. 31A and 31B are two-color dot arrangement patterns having the largest color variation quantity in theory.

FIGS. 31A and 31B show color arrangement of Y and C. The color variation quantity varies depending on whether a secondary color combination is C-M, M-Y or Y—C or the size and the like of dots of combined colors. In view of this, an experiment was conducted in which two types of patterns as shown in FIGS. 31A and 31B were reproduced using two colors of the same tone level and then a color variation quantity was obtained. As a result, it was found that a secondary color containing a Y component tends to have large quantity of color variation. This follows that RED as a combination of M-Y and GREEN as a combination of Y-C have large color variation quantity.

BLUE as a combination of C-M has smaller color variation quantity than those of RED and GREEN. In other words, the Y component which is the least conspicuous if used as a single color is mixed with other colors, it has the greatest influence on color variation. It is noted, however, that the absolute value of the color variation quantity of secondary color is lower than that of the color variation quantity of tertiary color.

Secondly, color variation quantity for tertiary color will be considered. In tertiary color, it is easy to imagine that a dot-on-dot pattern of the arrangement of three-color dots and a pattern in which respective colors are shifted one another by about a half-pixel have the largest color variation quantity.

The color variation quantity of the tertiary color caused by the shifts of color dots is larger than that of the secondary color in some case and smaller in others. It is, however, discovered that color variation quantity increases if color dots of medium sizes are combined. In this case as in the case of the secondary color, the value of the Y component has a large effect on color variation.

In view of the above features, this embodiment is designed to realize halftone dots constituted as described hereinafter so as to suppress unevenness of colors without lowering substantial resolution and deteriorating graininess.

As for colors of C, M and K having dot patterns visually conspicuous, the reference threshold array and the sequence among planes shown in FIG. 7A are employed to thereby realize an image constituted by dots of almost uniform size so as not to substantially lower resolution and deteriorate graininess.

On the other hand, as for color of Y having a dot pattern almost unrecognizable visually, the reference threshold array and the sequence among planes as shown in FIG. 7C or 7B to thereby realize an image constituted by dots of different sizes.

The advantages of the above processing will be described with reference to FIGS. 32A, 32B and 33A and 33B. While FIGS. 32A, 32B, 33A and 33B show the state of output with two colors of Y and C, the same thing is true for a combination of M and Y or M and tertiary color of C, M and Y.

FIGS. 32A and 32B show the result of processing input image data for color Y as in the case of C using such a high resolution sequence as that shown in FIG. 7A. FIG. 32A shows an output pattern in which two-color dots are not shifted and FIG. 32B shows an output pattern having the largest color slippage between two colors. In FIG. 32A, two-color dots are completely superposed on the other dot. In FIG. 32B, dots of two colors do not overlap at all. As can be seen, if the overlapping area rate of the two colors greatly changes, color variation quantity grows relatively.

Figures 33A, 33B:
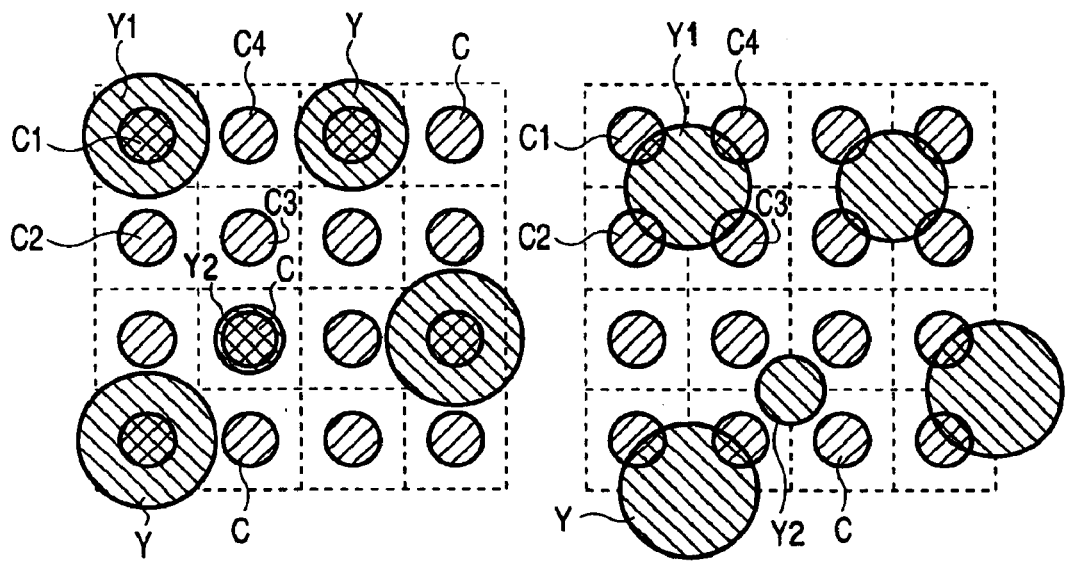
FIGS. 33A and 33B show positional shifts of dots between two colors according to the present invention.

Meanwhile, the output pattern in this embodiment is shown in FIGS. 33A and 33B. In FIGS. 33A and 33B, dots indicated by right upward slant lines indicate C and those indicated by right downward slant lines indicate Y. FIG. 33A shows an output pattern without color slippage between the two colors. FIG. 33B shows an output pattern which has the largest color slippage between the two colors and in which Y dots are shifted in the direction of 45 degrees right downward relative to horizontal direction. FIGS. 33A and 33B show the output patterns of Y which are the least conspicuous visually are constituted by various sizes of dots. If color dot slippage occurs to output patterns of FIG. 33A as seen in FIG. 33B, the area of the region in which a dot Y1, for example, having large diameter overlaps with dot C1 decreases but the overlapping of the dot Y1 with adjacent dots C2 to C4 occurs and a dot Y2 having small diameter does not overlap with other dots. As a whole, compensation is made so that the areas of regions in which two color dots overlap become stochastically constant. That is, a color variation rate is largely suppressed compared with the output patterns as shown in FIGS. 32A and 33A.

In this way, as for colors of C, M and K, such a threshold array as shown in FIG. 7A which basically does not lower resolution and does not deteriorate graininess is used. As for color of Y which is, as a single color, the least conspicuous visually, such a threshold array as shown in FIG. 7B in which an output image is constituted by various sizes of dots is used. By so doing, it is possible to obtain an output image which can suppress unevenness of colors and which can prevent the great deterioration of substantial resolution or graininess, that is, which can make the most use of the resolution of an output device.

Figure 34:
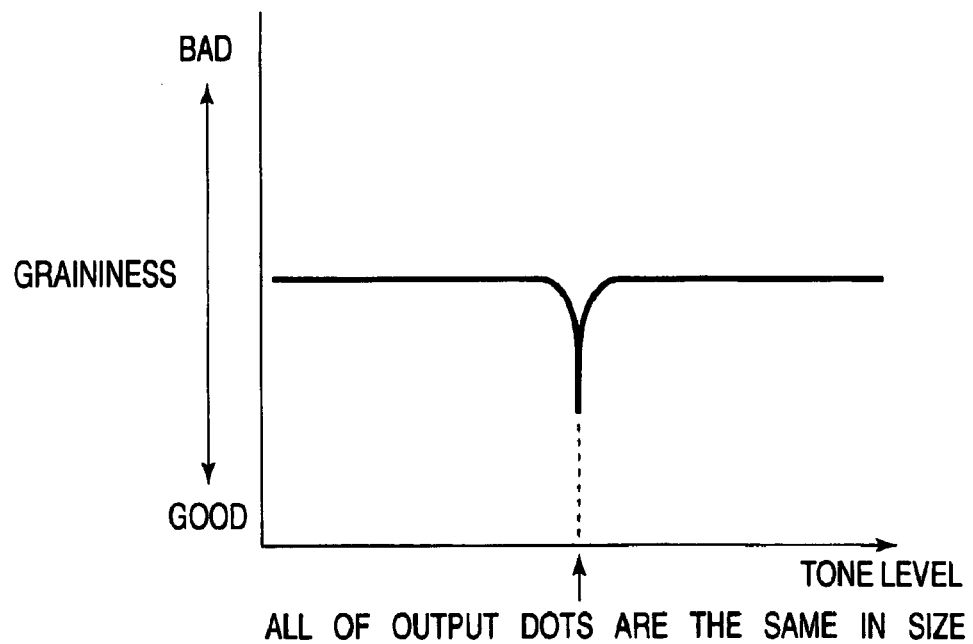
FIG. 34 is a graph showing graininess characteristics for solid printing with uniform dots.

A more preferred method of forming C, M and K patterns will be described hereinafter. As for colors of C, M and K, if the sequence shown in FIG. 7A is used, output characteristics in respect of graininess are such that neighborhoods of a tone part in which all of output dots are same in size have extremely good graininess compared with other tone parts as shown in FIG. 34.

Figure 35A:
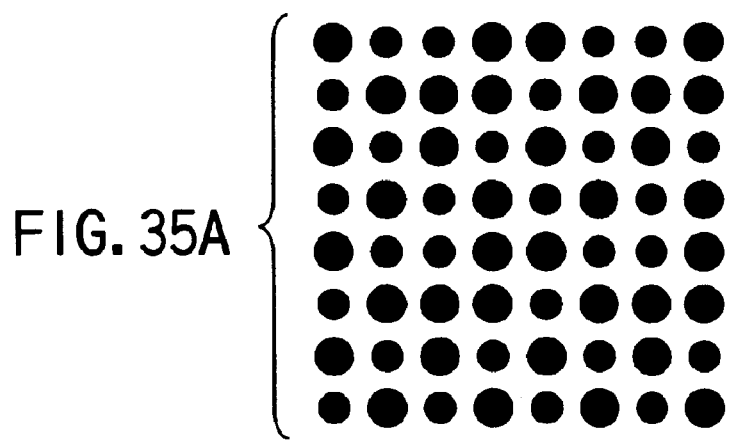
FIGS. 35A to 35C show examples of print patterns in the neighborhood of a solid-printed part with arbitrarily uniform dot size.
Figure 35B:
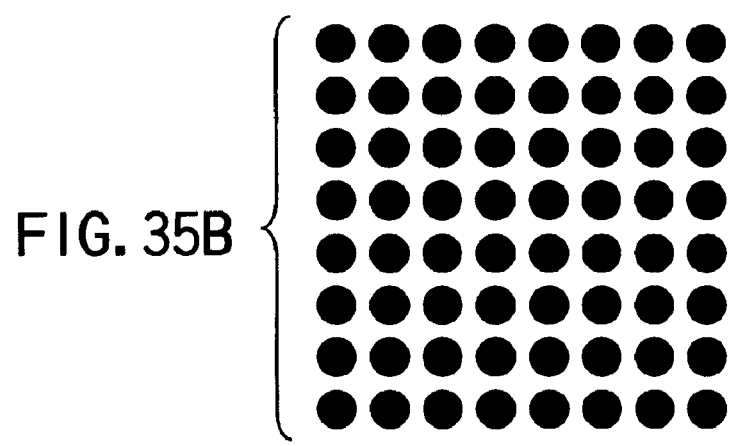
Figure 35C:
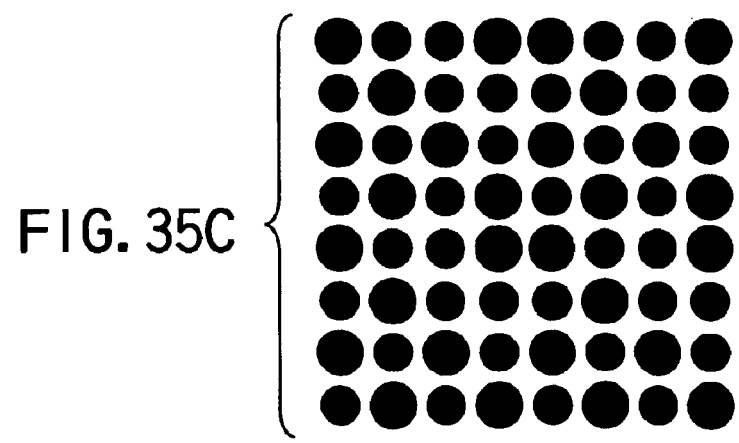
Figure 36A:
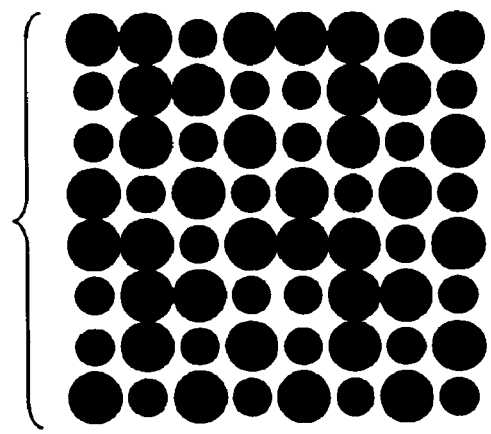
FIGS. 36A to 36C show examples of print patterns in the neighborhood of a solid-printed part with arbitrarily uniform dot size.
Figure 36B:
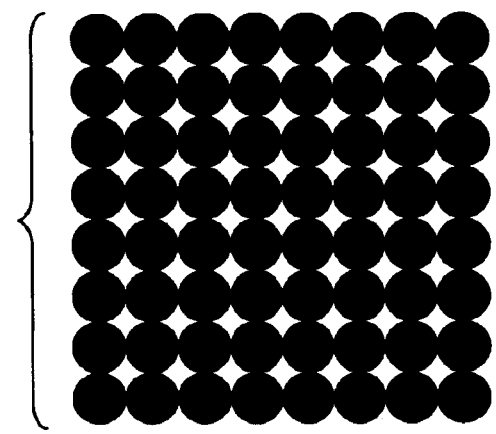
Figure 36C:
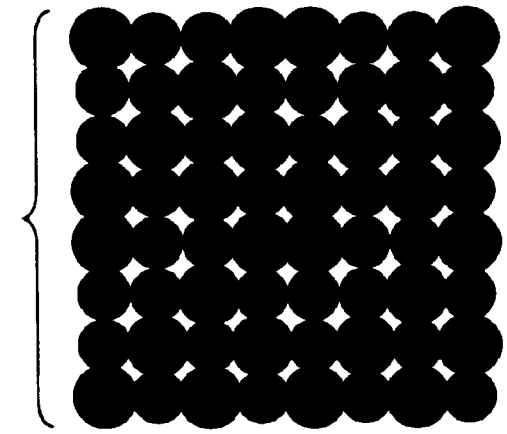
Figure 40:
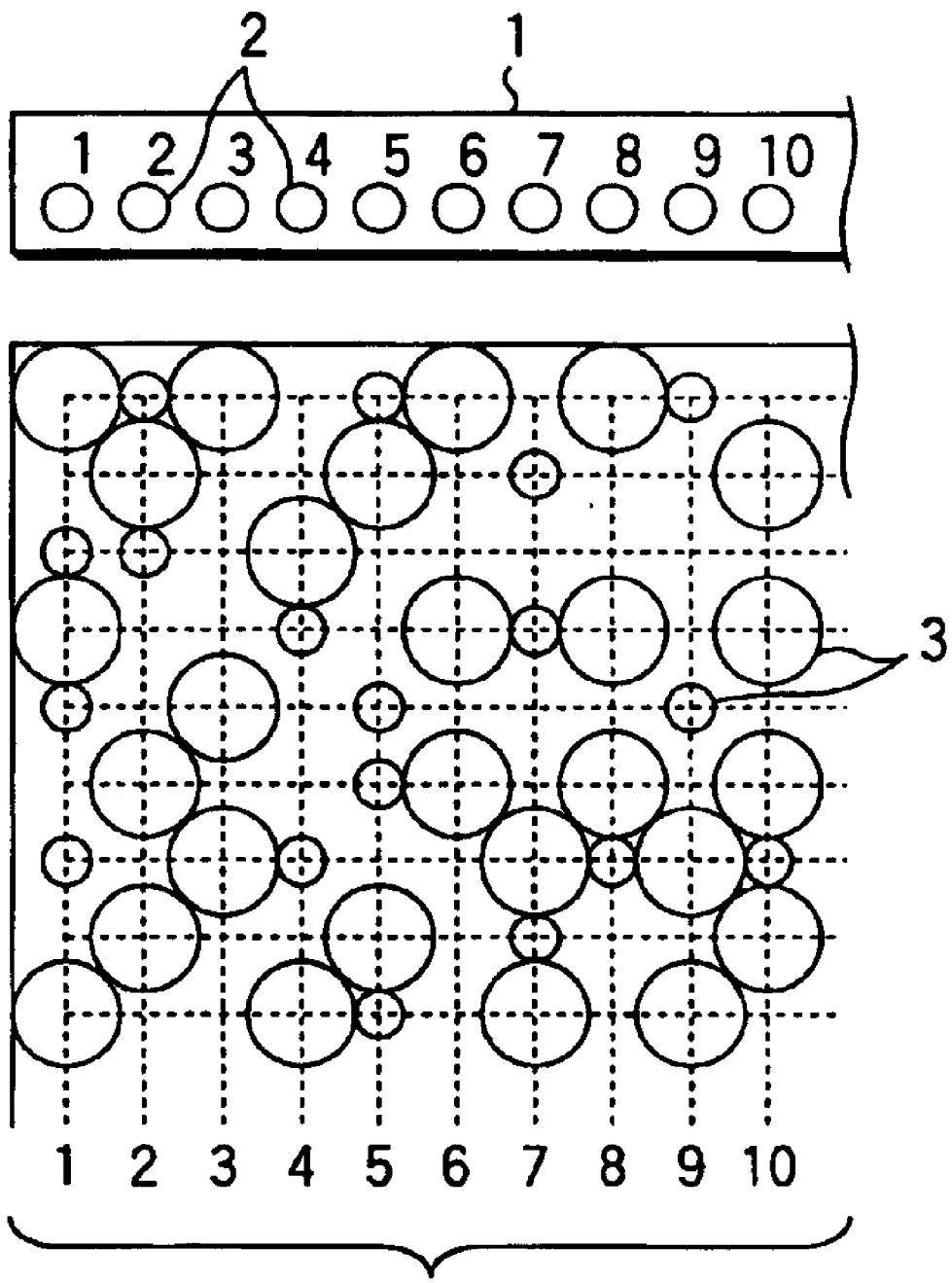
FIG. 40 shows a line recording head and a printing example by the line recording head.
Figure 41:
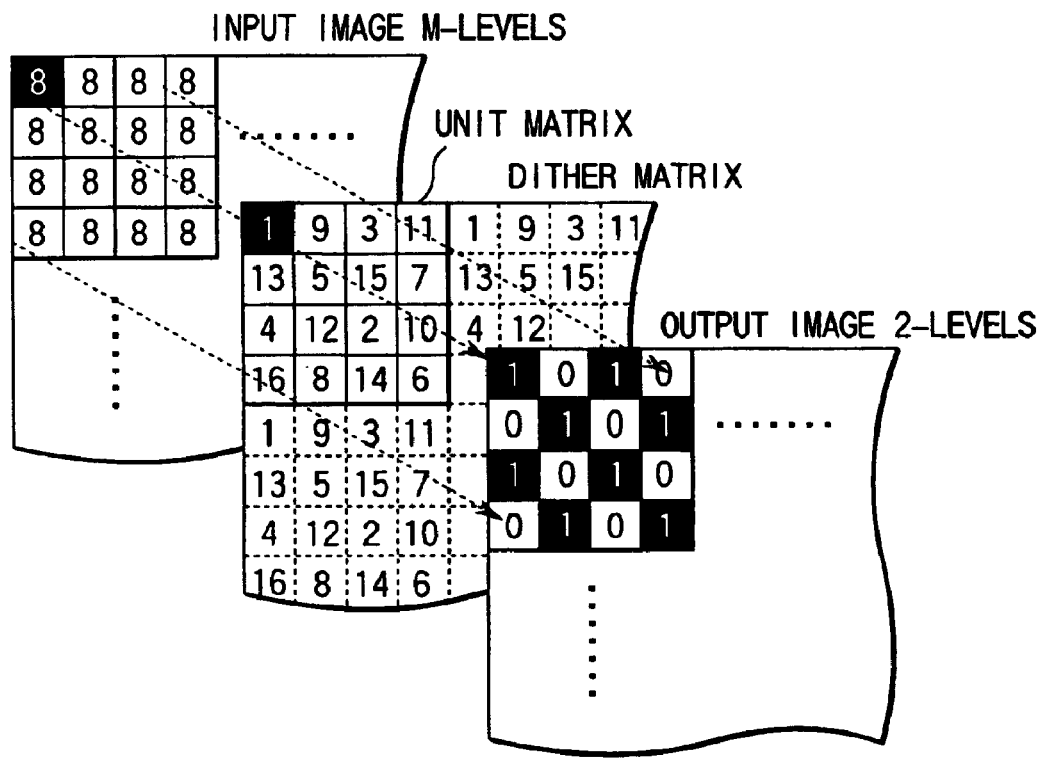
FIG. 41 shows an algorithm for a binary dither processing.
Figure 42:
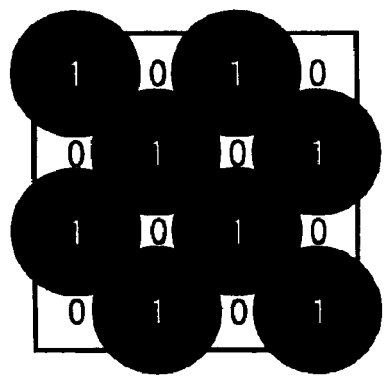
FIG. 42 shows a print output example by the binary dither processing of FIG. 41.
Figure 43:
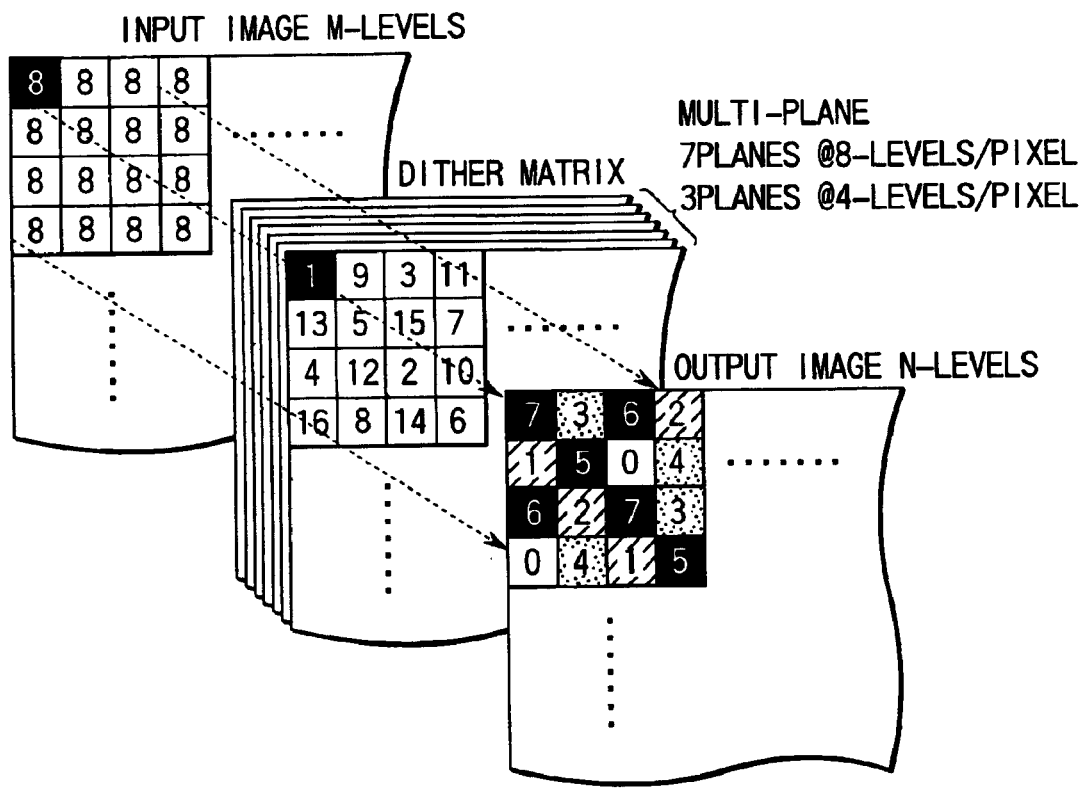
FIG. 43 shows an algorithm for a multi-level dither processing.
Figure 44:
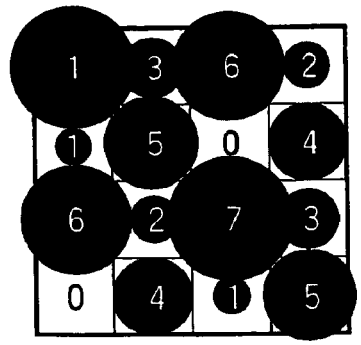
FIG. 44 shows a print output example by the multi-level dither processing of FIG. 43.

This state will be described with reference to FIGS. 35A to 35C and 36A to 36C. FIGS. 35A to 35C and 36A to 36C show output patterns in the neighborhood of tone parts in which all of output dots are the same in size. FIGS. 35A to 35C and FIG. 36A to 36C are basically different only in dot size. FIGS. 35A and 36B show output images with all of dots same in size. FIG. 35 show an image in a peculiar tone level having quite good graininess. FIGS. 35B and 36B show images obtained by processing input images of constant tone levels, i.e., input tone levels 17 and 33 in the threshold range of FIG. 7A, respectively, employing the threshold array of FIG. 7A. FIGS. 35A and 36A show images obtained by processing input images of constant tone levels lower than those of FIGS. 35B and 36B, respectively. FIGS. 35C and 36C show images obtained by processing input images of constant tone levels higher than those of FIGS. 35B and 36B, respectively.

If observing output patterns of FIGS. 35B and 36B in which exactly the same size of dots are arranged, it is seen that the output patterns have extremely good graininess compared with those of FIGS. 35A, 36A, 35C and 36C. Further, a gradation image is printed, graininess greatly differs between adjacent tone parts, which difference disadvantageously appears as texture. In view of the balance of tone reproducibility, such an output pattern as shown in FIG. 34 having extremely good graininess at a peculiar tone level, is not preferable.

Moreover, in the patterns shown in FIGS. 35B and 36B, dots are arranged uniformly. Due to this, even slight print position accuracy error is visually recognizable.

Considering the above, a method of providing balanced graininess by preventing dots in the tone part having the equal size of dots from being outputted by employing the sequence among threshold planes as shown in FIGS. 37A to 37C. In other words, in the sequence shown in FIG. 37A, the order of thresholds are forced to be changed before and after the thresholds corresponding to such a peculiar tone level. By doing so, dots of the same size are mixed with dots of other sizes in the neighborhood of this peculiar tone level and the dots thus mixed are outputted, which means that output priority orders are changed. These output states are shown in FIGS. 38A and 38B.

FIG. 38A shows an output pattern obtained by processing an input image of uniform tone level, i.e., the peculiar tone level stated above using the highest resolution sequence shown in FIG. 7A. FIG. 38B shows an output pattern obtained by processing the same input image as that in FIG. 38A while using the threshold sequence shown in FIG. 37A. In this way, according to this embodiment, it is possible to prevent all of dots of same size from being outputted. Consequently, by using the threshold sequence in this embodiment, an output image is constituted by dots of not less than two or three sizes at all tone levels.

As a result, a well-balanced output image having constant graininess throughout the tones can be obtained. It is noted that the output image obtained by using the threshold sequence of FIG. 37B is inferior in graininess to that obtained by using the threshold sequence of FIG. 37A. Taking the characteristics of the respective colors of C, M and K into consideration, the sequence of FIG. 37A may be employed for K and the sequence of FIG. 37B may be employed for C and M with which noise is less conspicuous than K to maintain high resolution, whereby an image of further uniform graininess can be obtained throughout the tone levels. Alternatively, the sequence of FIG. 37C may be employed only for K with which low graininess is most conspicuous to improve graininess.

Furthermore, it is possible to replace sequences shown in FIGS. 37B and 37C depending on the difference in relative size between dots of the respective tone levels. That is, if there is a larger difference in dot size between adjacent tone levels, the sequence can be replaced by that of FIG. 37B. If there is no difference in dot size, the sequence can be replaced by that of FIG. 37B.

Moreover, in the threshold sequences of FIGS. 37A to 37C, serial thresholds (e.g., thresholds 1 to 8) spread over only two planes. It is also possible to arrange serial thresholds (e.g., thresholds 1 to 10) spreading over two or more planes for the respective colors of C, M and K or depending on the difference in relative size among the tone level dots as shown in a threshold sequence of FIG. 39A. Likewise, upon evaluating the actual output characteristics, these sequences can be set variably for each threshold plane as shown in FIG. 39B. Namely, as long as an output pattern which does not basically include dot portions of the same size while maintaining resolution as much as possible, sequences other than those of FIGS. 37A to 37C can be arbitrarily employed.

The present invention has been described so far, while centering around the multi-level dither processing. The present invention should not be, however, limited to the multi-level dither processing. Those having ordinary skill in the art could easily apply the present invention to a density pattern method and the like. That is, according to the multi-level dither processing, the input image data and the dither thresholds have one-by-one relationship and the input image data and the finally outputted image data have one-by-one relationship. On the other hand, according to the density pattern method, input image data and conversion thresholds have 1:K (K≧2) correspondence and input image data and finally outputted image data have 1:K (K≧2) correspondence. Obviously, the multi-level dither processing method and density pattern method only differ in correspondence. Needless to say, K can be extended in both of or either of scan and sub-scan directions.

The embodiments of the present invention have been described while taking a case of employing a printer as image output means as an example. The image output means should not be, however, limited to the printer and a display unit such as a CRT display and a liquid crystal display, may be used as the image output means.

As stated so far, according to the present invention, it is possible to suppress occurrence of unevenness of density and stripes derived from the output accuracy of the output apparatus such as a printer and to thereby prevent the deterioration of tone reproducibility.

Furthermore, by employing an optimum sequence for each of the colors of C, M, Y and X, it is possible to suppress color unevenness and to obtain an output image having constant graininess throughout the tone levels while basically maintaining substantial resolution high.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processor for converting input image data having a first number of tones into halftone-processed image data having a second number of tones which is lower than the first number of tones by halftone processing, and for outputting a dot image corresponding to the halftone-processed image data, said image processor comprising:

halftone processing means for halftone-processing the input image data based on thresholds in a threshold array extending over a plurality of dither threshold planes each having a same size unit threshold matrix on which the thresholds are positioned, to produce the halftone-processed image data; and image output means, having a first output position accuracy in a first scan direction and a second output position accuracy which is lower than the first output position accuracy in a second scan direction orthogonal to the first scan direction, for outputting the dot image, which has continuous medium-to-high tone dots in the second scan direction, in accordance with the halftone-processed image data;

wherein an order of the thresholds on the unit threshold matrix is defined based on both a reference threshold array indicating the order of the thresholds positioned on the unit threshold matrix on each dither threshold plane and a threshold sequence indicating correlation among the plurality of dither threshold planes with respect to the threshold array; and wherein the medium-to-high tone dots are produced based on the order of the thresholds from medium to high in the unit threshold matrix, the order of the medium-to-high thresholds is of both an aperiodic array and an anisotropic array, and the anisotropic array includes neighboring thresholds having close values in the second scan direction.

2. An image processor according to claim 1, wherein low thresholds in the threshold array are arranged to be dispersed isotropically in the unit threshold matrix, and the image output means outputs an image having low-tone dots which are isotropically dispersed.

3. An image processor according to claim 1, wherein low thresholds in the threshold array are arranged to be dispersed anisotropically in the unit threshold matrix, and the image output means outputs an image having low-tone dots which are anisotropically dispersed.

4. An image processor according to claim 1, wherein the halftone processing means includes: (i) a first reference threshold array having low thresholds in the threshold array which are dispersed isotropically in the unit threshold matrix, and (ii) a second reference threshold array having the low thresholds in the threshold array which are dispersed anisotropically in the unit threshold matrix; and wherein the halftone processing means selects one of the first and second reference threshold arrays according to the output position accuracy of the image output means and uses the selected reference threshold array for the halftone processing.

5. An image processor according to claim 1, wherein the aperiodic medium-to-high-tone threshold array is derived from an approximation calculation model imitating output characteristics of the image output means.

6. An image processor according to claim 1, wherein the anisotropic medium-to-high-tone threshold array is determined using a convolution filtering operation, and anisotropic strength is determined by adjusting a constant of the convolution filtering operation, and wherein an optimum value of the constant is determined by a diameter and a distance of lowest-tone-level dots actually printed.

7. An image processor according to claim 1, wherein the aperiodic medium-to-high-tone threshold array is set at random.

8. An image processor according to claim 1, wherein the anisotropic medium-to-high-tone threshold array is set to have high anisotropy when a difference in the output position accuracy of the image output means between the first scan direction and the second scan direction is large and to have low anisotropy when the difference in the output position accuracy is small.

9. An image processor according to claim 1, wherein low thresholds are a lower 20% of the thresholds of the threshold array.

10. An image processor for converting input image data having M tones per pixel into a halftone-processed image data having N tones for K pixels by halftone processing, and for outputting a dot image corresponding to the halftone-processed image data, wherein K is greater than 1 and N is greater than 1, said image processor comprising:

halftone processing means for halftone-processing the input image data based on thresholds in a threshold array extending over a plurality of dither threshold planes each having a same size unit threshold matrix on which the thresholds are positioned to produce the halftone-processed image data; and image output means, having a first output position accuracy in a first scan direction and a second output position accuracy which is lower than the first output position accuracy in a second scan direction orthogonal to the first scan direction, for outputting the dot image, which has continuous medium-to-high tone dots in the second scan direction, in accordance with the halftone-processed image data;

wherein an order of the thresholds on the unit threshold matrix is defined based on both a reference threshold array indicating the order of the thresholds positioned on the unit threshold matrix on each dither threshold plane and a threshold sequence indicating correlation among the plurality of dither threshold planes with respect to the threshold array; and wherein the medium-to-high tone dots are produced based on the order of the thresholds from medium to high in the unit threshold matrix, the order of the medium-to-high thresholds is of both an aperiodic array and an anisotropic array, and the anisotropic array includes neighboring thresholds having close values in the second scan direction.

11. An image processor according to claim 10, wherein low thresholds in the threshold array are arranged to be dispersed isotropically in the unit threshold matrix, and the image output means outputs an image having low-tone dots which are isotropically dispersed.

12. An image processor according to claim 10, wherein low thresholds in said threshold array are arranged to be dispersed anisotropically in the unit threshold matrix, and the image output means outputs an image having low-tone dots anisotropically dispersed.

13. An image processor according to claim 10, wherein the halftone processing means includes: (i) a first reference threshold array having low thresholds in the threshold array which are dispersed isotropically in the unit threshold matrix, and (ii) a second reference threshold array having the low thresholds in the threshold array which are dispersed anisotropically in the unit threshold matrix; and wherein the halftone processing means selects one of the first and second reference threshold arrays according to the output position accuracy of the image output means and uses the selected reference threshold array for the halftone processing.

14. An image processor according to claim 10, wherein the aperiodic medium-to-high-tone threshold array is derived from an approximation calculation model imitating output characteristics of the image output means.

15. An image processor according to claim 10, wherein the aperiodic medium-to-high-tone threshold array is set at random.

16. An image processor according to claim 10, wherein the anisotropic medium-to-high-tone threshold array is set to have high anisotropy when a difference in the output position accuracy of the image output means between the first scan direction and the second scan direction is large and to have low anisotropy when the difference in the output position accuracy is small.

17. An image processor according to claim 10, wherein low thresholds are lower 20% thresholds of said threshold array.

18. An image processor for converting color input image data having a first number of tones into a halftone-processed image data having a second number of tones which is lower than the first number of tones by halftone processing and for outputting a dot image corresponding to the halftone-processed image data, said image processor comprising:

halftone processing means for halftone-processing the input image data based on thresholds in a threshold array extending over a plurality of dither threshold planes each having a same size unit threshold matrix on which the threshold is positioned to produce the halftone-processed image data, the halftone processing means carrying out both a first halftone processing using the threshold array for at least two color components and a second halftone processing based on an error diffusion processing for color components other than the two color components; and color image output means, having a first output position accuracy in a first scan direction and a second output position accuracy which is lower than the first output position accuracy in a second scan direction orthogonal to the first scan direction, for outputting the dot image which has continuous medium-to-high tone dots in the second scan direction in accordance with the halftone-processed image data;

wherein an order of the thresholds on each unit threshold matrix is defined based on both a reference threshold array indicating the order of the thresholds positioned in the unit threshold matrix on each dither threshold plane and a threshold sequence indicating correlation among the plurality of dither threshold planes with respect to the threshold array; and wherein the medium-to-high tone dots are produced based on the order of the thresholds from medium to high in the unit threshold matrix, the order of the medium-to-high thresholds is of both an aperiodic array and an anisotropic array, and the anisotropic array includes neighboring thresholds having close values in the second scan direction.

19. An image processor according to claim 18, wherein the halftone processing means carries out the halftone processing using, as the threshold array extending over the plurality of dither threshold planes, a threshold array in which substantial resolutions of color components other than a yellow component are highest.

20. An image processor for converting color input image data having a first number of tones into image data having a second number of tones which is lower than said first number of tones by a halftone processing and for outputting an image corresponding to the image data, said image processor comprising:

halftone processing means for carrying out the halftone processing using a plurality of threshold planes and for providing halftone-processed image data; and color image output means for outputting an image corresponding to said halftone-processed image data provided from said halftone processing means, wherein said color input image data contains a yellow component; and wherein serial thresholds for respective colors are arranged to extend over said plurality of dither threshold planes, there are more dither threshold planes over which said serial thresholds extend for yellow than for any other color, and there are more types of output yellow dot sizes than for other colors.

21. An image processor according to claim 20, wherein thresholds of similar sizes are arranged on one threshold plane for color components other than the yellow component, and the serial thresholds are arranged to extend over other threshold planes near thresholds corresponding to a specific tone so as to prevent an image containing all single-size dots from being printed if a uniform input image of said specific tone is reproduced.

* * * * *